(12) United States Patent
Birger

(10) Patent No.: US 8,067,059 B2
(45) Date of Patent: Nov. 29, 2011

(54) HYDROPHOBIC COMPOSITES AND PARTICULATES AND APPLICATIONS THEREOF

(75) Inventor: Zeev Birger, Kfar Shmaryahu (IL)

(73) Assignee: Superseal Ltd., Kfar Shmaryahu (IL)

( * ) Notice: Subject to any disclaimer, the term of this patent is extended or adjusted under 35 U.S.C. 154(b) by 1588 days.

(21) Appl. No.: 10/563,853

(22) PCT Filed: Jul. 14, 2004

(86) PCT No.: PCT/IL2004/000635
§ 371 (c)(1),
(2), (4) Date: Mar. 1, 2006

(87) PCT Pub. No.: WO2005/005566
PCT Pub. Date: Jan. 20, 2005

(65) Prior Publication Data
US 2006/0257643 A1      Nov. 16, 2006

Related U.S. Application Data

(60) Provisional application No. 60/486,420, filed on Jul. 14, 2003, provisional application No. 60/486,419, filed on Jul. 14, 2003.

(30) Foreign Application Priority Data

Aug. 17, 2003   (IL) .......................................... 157437

(51) Int. Cl.
*B32B 5/66* (2006.01)

(52) U.S. Cl. ........ 427/204; 427/205; 427/214; 427/215; 427/218; 427/221; 428/403; 428/407

(58) Field of Classification Search .................. 428/403, 428/407; 427/214, 221, 204, 205, 215, 218
See application file for complete search history.

(56) References Cited

U.S. PATENT DOCUMENTS

| | | |
|---|---|---|
| 3,561,999 A | 2/1971 | Iannicelli |
| 3,562,153 A | 2/1971 | Tully et al. |
| 3,567,492 A | 3/1971 | Burrill |
| 3,672,945 A | 6/1972 | Taylor |
| 3,816,154 A | 6/1974 | Baldyga et al. |
| 3,973,510 A | 8/1976 | McCulloch et al. |
| 3,980,566 A | 9/1976 | Peterson |
| 4,148,941 A | 4/1979 | Pape et al. |
| 4,231,884 A | 11/1980 | Dorius |
| 4,256,501 A | 3/1981 | Banino |
| 4,474,852 A * | 10/1984 | Craig .............................. 428/403 |
| 5,057,151 A | 10/1991 | Schuster et al. |
| 5,180,638 A | 1/1993 | Teekman et al. |
| 5,183,710 A | 2/1993 | Gerbino |
| 5,286,293 A | 2/1994 | Li et al. |
| 5,326,573 A | 7/1994 | Antfang et al. |
| 5,486,420 A | 1/1996 | Nishihara et al. |
| 5,506,049 A | 4/1996 | Swei et al. |
| 5,580,657 A | 12/1996 | Schleifstein et al. |
| 5,747,561 A | 5/1998 | Smirnov et al. |
| 5,853,886 A | 12/1998 | Pinnavaia et al. |
| 5,968,531 A | 10/1999 | Miyoshi et al. |
| 6,017,595 A | 1/2000 | Brenot et al. |
| 6,139,622 A | 10/2000 | Gobel et al. |
| 6,262,171 B1 | 7/2001 | Mayer et al. |
| 6,344,240 B1 | 2/2002 | Menon et al. |
| 6,383,386 B1 | 5/2002 | Hying et al. |
| 6,478,648 B1 | 11/2002 | Applewhite et al. |
| 6,537,665 B2 | 3/2003 | O'Connor et al. |
| 6,545,083 B1 | 4/2003 | Hirata et al. |
| 6,548,264 B1 | 4/2003 | Tan et al. |
| 6,682,809 B2 | 1/2004 | Van Rheenen |
| 6,685,966 B1 | 2/2004 | Dominique et al. |
| 6,689,854 B2 | 2/2004 | Fan et al. |
| 6,710,107 B2 | 3/2004 | Audibert et al. |
| 6,727,315 B2 | 4/2004 | Yamamoto et al. |
| 6,761,765 B2 | 7/2004 | Lu |
| 6,764,745 B1 | 7/2004 | Karasawa et al. |
| 6,767,580 B2 | 7/2004 | Caroline et al. |
| 6,811,854 B1 | 11/2004 | Sato et al. |
| 6,822,020 B2 | 11/2004 | Revis |
| 6,866,709 B1 | 3/2005 | Holbek et al. |
| 6,881,440 B2 | 4/2005 | Caroline et al. |
| 6,881,481 B2 | 4/2005 | Hasegawa et al. |
| 6,893,985 B2 | 5/2005 | Goodner |
| 6,911,494 B2 | 6/2005 | Yamashita et al. |
| 6,919,388 B2 | 7/2005 | Nishikawa et al. |
| 6,939,402 B2 | 9/2005 | Choi et al. |
| 6,939,922 B2 | 9/2005 | Beckley et al. |

FOREIGN PATENT DOCUMENTS

| | | | |
|---|---|---|---|
| WO | WO 03/044124 | | 5/2003 |
| WO | WO03/044124 | * | 5/2003 |

OTHER PUBLICATIONS

JP 2258250 Abstract, Dialog(R)File 351:Derwent World Patent Index, WPI Acc. No. 1990-358037/199048.
EP 378735 Abstract (Equivalent to US 5057151).
EP 146591 Abstract (Equivalent to US 4474852).

* cited by examiner

*Primary Examiner* — Leszek Kiliman
(74) *Attorney, Agent, or Firm* — Fish & Richardson P.C.

(57) ABSTRACT

Novel hydrophobic composites, particularly hydrophobic particulates and free-flowing hydrophobic aggregates and methods utilizing same are disclosed.

30 Claims, 12 Drawing Sheets

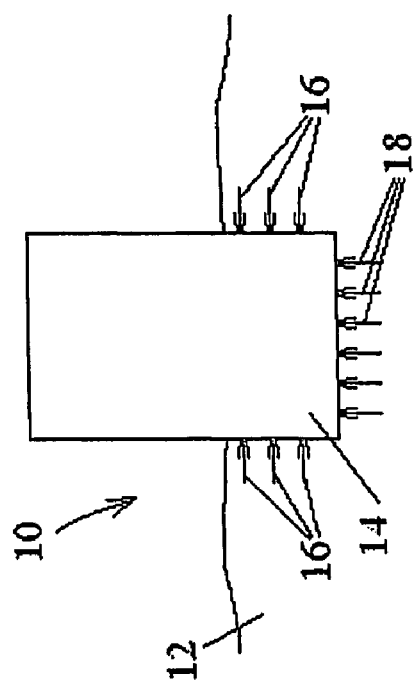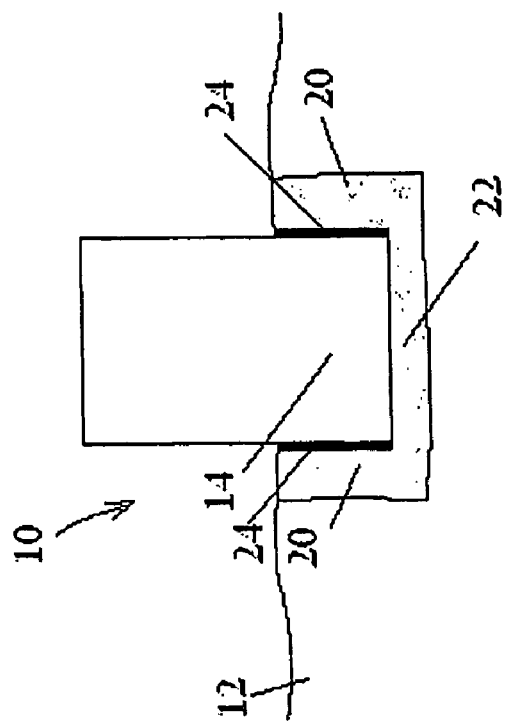

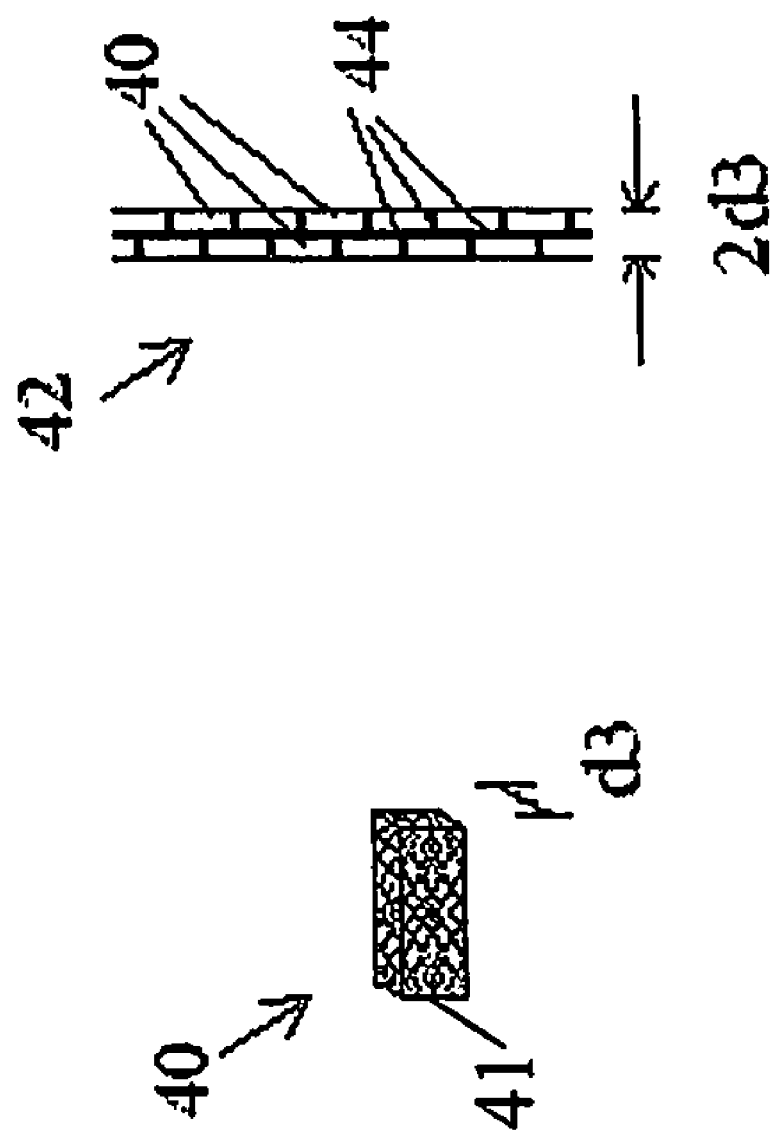

HYDROPHOBIC COMPOSITES AND PARTICULATES AND APPLICATIONS THEREOF

CROSS-REFERENCE TO PRIOR APPLICATION

The above-referenced application is the U.S. National Phase of International Patent Application No. PCT/IL2004/000635, filed Jul. 14, 2004, which claims priority from U.S. Provisional Patent Application Nos. 60/486,420, filed Jul. 14, 2003 and 60/486,419, filed Jul. 14, 2003 and Israel Patent Application No. 157437, filed Aug. 17, 2003, all of which are incorporated by reference herein. The International application was published on Jan. 20, 2005 as WO 2005/005566 A2 under PCT article 21(2).

FIELD AND BACKGROUND OF THE INVENTION

The present invention relates to hydrophobic composites, particulates and free-flowing aggregates, methods of producing same, and applications thereof. More particularly, the present invention relates to hydrophobic composites having a core material coated by a hydrophobic powder having an impure element pre-treated with a hydrophobic hydrocarbon, and optionally with additional coating agents, such that the resulting composites are characterized by superior water-repellency and durability, suitable for various applications. The present invention further related to hydrophobic composites that are prepared in aqueous solutions.

In many applications it is desired to prevent moisture from reaching critical regions using hydrophobic materials which repel water. In the area of civil engineering, when water percolate into construction, salts and minerals present in the water damage the concrete (or other materials from which the construction is made), and causes corrosion and deformation to its reinforcing steel bars or wire fabric. Such corrosion and deformation leads to the appearance of cracks in the concrete and, eventually, to a local reduction of construction strength. Other internal objects, such as pipes, electrical wires, communication channels and the like may also be damage by moisture.

The presence of water in the house is associated with numerous of unpleasant evidences such as, moisture at the base of the walls, under carpeting or under floor tiles; rust at the base of steel posts; stains, discoloration or decay of wood, paneling, drywall and other objects close to the floor, walls or ceiling; molds and mildew on concrete, furnishings or carpets; efflorescence ("white powder") on the concrete; peeled floor tiles; damp odor; "sweating" walls (condensation of excessive humidity); condensation of water on windows; plugged or damaged rain gutters; growth of moss and the like.

Moisture may percolate into the construction, either vertically, for example because of accumulation of water on roofs or floors of construction/foundations, or horizontally, by leakage of water through external walls of a building for example, because of extreme weather conditions. A sever problem of horizontal leakage is in buried walls or portions thereof, where hydrostatic pressure generated by excess moisture in the surrounding soil pushing in on the outside of the foundation wall, significantly contributes to horizontal leakage.

The percolation of moisture through concrete walls is explained by the porosity of the concrete (about 12%-20%), formed during the curing process when surplus water creates a network of interconnected capillaries, about 10-100 nm in diameter.

As used herein, the term about refers to ±10%.

These capillaries contribute to the percolation of moisture there through via capillary forces. As the concrete ages, the water percolation, gradually leaches out the concrete and makes it more and more porous.

Another problem caused by moisture is mildew, which, apart from being unaesthetic, creates a musty odor. Even though a substantial amount of standing water may be removed by prior art waterproofing methods that utilize a drainage conduit, residual moisture will still cause mildew problems. It is recognized that a prolonged exposure to mildew may cause many health problems, such as, allergies, asthma, skin diseases and the like.

Basement is by far the largest source of moisture in a house. Covered floor and walls in the finished basement trap moisture and eventually cause damp or wet basement. As the pH level of the concrete is high, the alkalis present in the concrete dissolved by the water and attack paints and floor tiles. Hence, even if the basement looks dry, moisture is pouring in by seeping through capillaries. The mildew, which is typically initiated in the basement due to its excessive amount of moisture, may spread to other areas of the house above ground, e.g., by ventilation.

In many countries sand is used as a bed under the floor tiles and is recommended by standards in order to reduce noise. Water, originating from periodic cleaning pluming leakage or heavy rain (e.g., in tiled roofs) generate a substantial amount of excessive weight, up to approximately 100 Kilograms of water per square meter. Large portion of the water is trapped under the tiles and the sand thus remains wet for many years. Such excessive weight is typically taken under consideration by the engineer in the planning stages of the building, which, in order to increase the strength to the construction, uses more concrete and reinforcing material under the sand bed. The contribution of the water and construction extra strengthening to the overall weight accelerates the sinking of the building. The problem is only aggravated in hanging structures such as balconies and overpasses, interconnecting different parts of buildings.

In addition to its excessive weight, the wet sand under the tiles attracts insects, such as ants, warms, aphids, dust mites and the like. Apart from the recognised health problems associated with such attraction, the insects excavate through the sand and accelerate sinking of the tiles.

Being wet most of the time, the sand under the floor tiles becomes a thermal conductor, thus reducing any isolation pretended to be achieved in the design stages of the building. In some buildings, an electrical heating system is constructed under the floor. The contact between these systems and the wet sand may cause a sever damage to the system, or, in extreme cases, even fire may occur.

With respect to under floor waterproofing of balconies or tiled roofs, all prior art methods are directed at positioning a waterproofing material such as a sealing sheet, a bituminous membrane or a solvent based elastomeric coat, under the bed sand supporting the floor tiles. However, almost irrespectively of their quality, the life time of these waterproofing materials is not sufficient, because of the salts containing moisture being present in the sand.

Even in constructions or part of constructions where sand is not in contact with the waterproofing material, the life time of prior art materials is limited. Alkalis dissolved in the water attack paints and adhesives and damage the waterproofing material, by formation of cracks, peels or blisters.

An additional indoors problem related to sealing means is the problem of elevated levels of Radon gas which may be found in houses, typically, but not exclusively, in the lower parts thereof, e.g., basements. Radon is an invisible and odourless radioactive gas, produced by the decay of radioactive heavy metals uranium and thorium, dispersed throughout the Earth's crust. The by-products of the radioactive decay of these metals are lighter radioactive heavy metals which also decay into lighter metals and so on. The decay chain continuously produces radium, which decays into radon isotopes, mainly Radon-222 and Radon-220 (the latter also known as Thoron), where the Radon-222 isotope is the most common indoors radioactive gas.

Radon decay products are tiny radioactive solid particles which float in the air and, breathed by human, get trapped in the lungs, trachea and bronchi. Because of these decay products, the Radon, at the levels common in homes, is about 1,000 times more lethal than the safety limits on any other toxin or carcinogen.

Being the heaviest known gas (nine times heavier than air), the Radon gas naturally moves into the permeable soil and the gravel bed surrounding the foundations of the house and subsequently diffusively penetrates into the house through the above mentioned openings and pores in concrete. Radon is soluble in water and therefore carried to the vicinity of the house by underground streams, and further into the house by the percolation of water, e.g., through the concrete. The most common carrier of Radon into the house is water.

Moisture and water also cause damage to buried objects, such as underground pipes, storage tanks (e.g., gas tanks), tunnels and cables. Due to moisture, corrosion caused by electrolysis, digesting materials, insects and/or micro organisms present in the sand, many buried objects are exposed to damaging processes which reduce the lifetime of the objects. In cases where the buried object contains hazardous materials any leakage there from may have severe environmental consequences.

In the area of electric power industry, numerous research programs have been conducted to identify mechanisms which are responsible for the premature failure of underground electrical or communication cables. It is recognized that many of the premature cable failures are linked to internal build-up of micro sized water branches within imperfections of the insulating layers of the cable, also known as "water trees." The water filled imperfections branch radially inward through the amorphous insulating materials. As the water progresses radially inward the potential for cable failure increases.

Even when the conducting core of the cable is coated by a sophisticated material such as a liquid crystal polymer, the formation of imperfections is inevitable due to corrosion caused by electrolysis, digesting materials, insects and/or micro organisms present underground.

Buried pipes and electrical or communication channels are often positioned inside hollow underground tubes. The hollow tubes also ease access to the buried object, for maintenance purposes. However, water or other liquids occasionally find the way into the space between the buried object and the internal surface of the surrounding tube (e.g., through holes or cracks formed in the external surfaces of the tubes, or through the gap between contacting tubes). The water flows through the tube and causes damages to the buried objects or to connection boxes at the end of the tube.

The combination of moisture and sand tends to harden or freeze. The formed hard material is known to transform axial stresses from the surrounding environment to the buried object. When the level of the axial stresses exceeds the object's characteristic strength, the object is damaged. To prevent the above axial stresses, the objects are made stronger and/or being buried deep into the ground. It is recognized, however, that the cost of positioning objects underground increases with the depth in which these objects are to be buried. Moreover, deep buried objects are difficult to be accessed, e.g., for maintenance or replacement.

One way to protect an underground object tube is by applying a sealing coat on the object or its surrounding tube, so as to prevent the above agents from damaging its external surface. However, although in general such coats survive the attack of digesting materials or organisms, very often local damages to the coat are inevitable (for example due to axial stresses), which local damages are sufficient to initiate the erosion of the object.

Generally, moisture can be prevented from reaching critical regions by the use of hydrophobic materials which repel water. Design considerations for hydrophobic materials depend on the application for which such materials are designated, and include water intrusion pressure, thickness, chemical compatibility, airflow, temperature compatibility and the like. Water intrusion pressure is a measure of a critical pressure under which water are forced through the hydrophobic material. Chemical compatibility is important in applications where the hydrophobic material comes in contact with corrosive material.

Another structure for which waterproofing is required is a water reservoir, where the base and the walls thereof need to be impermeable so as to prevent water from leaking out. The problem of leaking reservoir is crucial in arid regions where one desire to maintain the content of the reservoir for as much as time possible.

A typical reservoir is a flat area surrounded by a sloping embankment. In many prior art waterproofing methods, the bottom of the reservoir (both the flat base and the sloping embankment) are covered with sealing sheets (typically made of high density polyethylene, HDPE), adhered or welded to each other. This method suffers from many drawbacks. First, because the waterproofing is by a plurality of bonded sealing sheets, there are many areas near the connection between two adjacent sheets where the bonding is damaged or not perfect, and the sheets become permeable. Second, due to its limited elasticity, the sealing sheet tends to be damaged by hard objects, being in contact therewith either from above or from below. Third, during maintenance, when the bottom of the reservoir is cleaned by light machinery or manually, the sealing sheets may be ruptured. Forth, forces induce earth movements or cracks formation (e.g., in a man made concrete reservoir) rupture the sealing sheets. An additional limitation of prior art method is originated by colonies of insects and organisms present under the sealing sheets. In which case purification chemicals are required to purify the content of the reservoir.

Waterproofing is often required also in agriculture or gardening where irrigation is employed. When an area is artificially irrigated by water, only a relatively small portion of water reach the plants growing on the soil. Most of the water seeps through the earth or evaporates. The need to save water is also related to other agricultural problems, such as salty soil and underground salty water. Generally, when designing an area for gardening or for industrial agriculture use, it is difficult to provide the plant a sufficient amount of water without causing rottenness, while, at the same time, preventing hazardous materials (such as salts) from damaging the roots.

Design considerations for hydrophobic materials to be used for waterproofing any of the above structures include water intrusion pressure, thickness, chemical compatibility, airflow, temperature compatibility and the like. Water intrusion pressure is a measure of a critical pressure under which water are forced through the hydrophobic material. Chemical compatibility is important in applications where the hydrophobic material comes in contact with corrosive material.

Over the years, numerous hydrophobic materials have been developed, including PTFE, nylon, glass fibers, polyethersulfone and aggregates having hydrophobic properties.

One such material is disclosed in U.S. Pat. No. 3,562,153, to Tully et al. The oil absorbent compositions of the Tully et al. patent are obtained by treating a liquid absorbent material, which may be particulate, granular or fibrous in nature, with a colloidal metal or metalloid oxide which is chemically bonded to an organosilicon compound to render the metal or metalloid oxide hydrophobic. The hydrophobic oxide-treated absorbent composition is contacted with the oil-contaminated water and selectively removes the oil therefrom. The oil absorbent composition of Tully et al. is reported to have excellent water repellency, thus enabling it to maintain its oil absorbent efficiency for long immersion periods.

U.S. Pat. No. 4,474,852, to Craig, which is incorporated by reference as if fully set forth herein, combines ideas of several prior art patents (U.S. Pat. Nos. 3,567,492, 3,672,945, 3,973, 510, 3,980,566, 4,148,941 and 4,256,501, the contents of all of which are hereby incorporated by reference). According to Craig, hydrophobic composites having superior water repellency are obtainable by depositing on a particulate and granular core material an adherent first coat which comprises a film-forming polyurethane and asphalt, as an optional additive, and applying to the thus coated core material a second coat comprising a hydrophobic colloidal oxide such as, for example, hydrophobic fumed silica. Craig teaches that the adherent first coat should not exceed 1 weight percentage of the total dry aggregate weight while the second coat is between 0.025 and 0.25 weight percentage of this total weight. Further according to the teachings of Craig, hydrophobic composites prepared in this manner not only prevent water from adhering to the surfaces of the individual composite particles, but also from entering the interstitial spaces of the aggregates of the composites.

WO 03/044124, which is also incorporated by reference as if fully set forth herein, also discloses a method of preparing hydrophobic aggregates, which is based on the teachings of Craig (U.S. Pat. No. 4,474,852). According to the teachings of WO 03/044124, the hydrophobic aggregates disclosed in U.S. Pat. No. 4,474,852 are not satisfactory as they do not withstand water pressure higher than 2-3 centimeters.

In a search for a method of producing hydrophobic aggregates with improved water-repellency and oil absorbency performance and improved durability under higher water pressures, it was concluded, according to the teachings of WO 03/044124, that an improved method of preparing hydrophobic aggregates, as compared with the teachings of Craig, should include changes relating to the compositions of the first and second coat and the relative amounts thereof, to the temperature in the various process steps and to the mixing rate during the course of preparation.

Hence, the method disclosed in WO 03/044124 includes depositing on a particulate or granulate core material an adherent first coat which comprises a film-forming agent such as polyurethane and optionally a gluing agent such as liquid asphalt, and applying to the thus coated core material a second coat which comprises a hydrophobic fumed silicate or any other superhydrophobic powder. According to the teachings of WO 03/044124, the adherent first coat constitutes about 1-2 weight percentages of the total dry aggregate weight while the second coat constitutes more than 5 weight percentages of this total weight. Further according to the teachings of WO 03/044124, such hydrophobic aggregate is capable of holding a water pressure of up to 20-30 cm.

Although WO 03/044124 teaches the use of superhydrophobic powders other than hydrophobic fumed silica, this reference neither specifies nor exemplifies such a superhydrophobic powder. This reference also fails to demonstrate any performance of the hydrophobic aggregates disclosed therein with regard to both, water repellency and its behavior under high water pressures. Furthermore, it is well known in the art that using such a large amount of hydrophobic fumed silica as the second coat, as taught by WO 03/044124, reduces the cost-effectiveness as well as the simplicity of the process.

In addition, as hydrophobic fumed silica, as well as other metal oxides treated with organosilicon compounds, such as those disclosed in the Craig patent, are characterized as acidic substances, aggregates coated by such materials are susceptible to reactions with alkaline reagents such as detergents. This feature limits the use of such aggregates in applications where detergents may be in contact with the hydrophobic aggregates, such as, for example, top-coatings of various surfaces.

U.S. Pat. No. 4,474,852 mentioned hereinabove describes several applications for its hydrophobic composites in waterproofing applications. Mainly as a top coat on paved surfaces, such as asphalt or concrete, a flood coat of asphalt sealer should first be applied over the surface, immediately after which a heavy coat of the hydrophobic composites may be sprayed over and rolled into the asphalt sealer, providing a watertight top coat. The same top coating technique may be used in pothole repairs in roadways.

The composites may also be used as a substitute for common aggregate in asphalt roofing or shingles, or in built-up roofing. In such applications, the hydrophobic composites are effective in preventing water penetration and resulting damage caused by freeze-thaw cycles as well as dimensional changes due to wetting and drying. U.S. Pat. No. 4,474,852 also claims utility as a top coat on paved surfaces, such as asphalt or concrete road surfaces or bridge decking, providing a water-tight finish, which substantially reduces freeze-thaw damage, and which is unaffected by salt compositions normally used for ice removal. In addition, these hydrophobic composites may be applied to painted surfaces to provide a durable, waterproof finish over wood, metal, concrete, stone, brick and certain synthetic substrates. Such hydrophobic composites may also be blended with suitable binding agents to provide a water-repellent coat.

As the American Concrete Institute (ACI) recommends a 3-inch pervious sand bed spread on top of waterproofing sheet under the building, the hydrophobic composite of U.S. Pat. No. 4,474,852 may also be used as a waterproofing agent in pavement construction, as a fill or bed material under concrete slabs or as a gravel fill or ballast for road beds or sidewalks. However, as will be appreciate by a skilled artisan, free-flowing aggregate are made of extremely small particulates hence being easily carried in the wind and washed out by running water. Therefore, without specific and enabling instructions, it would be very difficult and probably not practical to use the hydrophobic aggregate in its flowing form.

Furthermore, presently known methods of producing hydrophobic composites do not result in satisfactory products and are limited by other parameters, such as, for example, cost effectiveness.

There is thus a widely recognized need for, and it would be highly advantageous to have hydrophobic composites, particulates and free-flowing aggregates, methods of producing same and applications thereof, devoid the above limitations.

SUMMARY OF THE INVENTION

While conceiving the present invention, it was envisioned that by further changing the constituents of the first and second coats and the relative amounts thereof, cost-efficient hydrophobic composites with improved physical and chemical performances would be obtainable. Particularly, it was hypothesized that by using as a coat a hydrophobic powder comprised of impure elements that have been pre-treated with a hydrocarbon such as a long-chain fatty acid (e.g., stearic acid), hydrophobic composites with improved performance would be cost-efficiently obtainable.

While reducing the present invention to practice, it was indeed found that by using the hydrophobic powder described above, hydrophobic composites having superior physical and chemical performances as compared with the presently known hydrophobic composites were obtained. These newly disclosed composites comprise a hydrophobic coating which constitutes not more than 5 weight percentages of the total weight of the composite and are characterized by superb water-repellency and other beneficial properties, as is detailed hereinbelow.

Hence, according to one aspect of the present invention there is provided a hydrophobic composite comprising a core material coated by a hydrophobic powder, the hydrophobic powder comprises at least one impure element having a hydrocarbon chain attached thereto.

According to further features in preferred embodiments of the invention described below, the element is selected from the group consisting of a metallic element, a semi-metallic element and a transition metallic element.

According to still further features in the described preferred embodiments the hydrophobic powder is bonded to the core material via an adherent layer.

According to still further features in the described preferred embodiments the hydrophobic composite further comprising at least one additive selected from the group consisting of a coloring agent, a UV resistant agent, a bleaching agent and an abrasive agent.

According to still further features in the described preferred embodiments the coloring agent constitutes between about 0.1 and about 2 weight percentages of the hydrophobic composite.

According to still further features in the described preferred embodiments the UV resistant agent and the bleaching agent each constitutes between about 0.01 and about 2 weight percentages of the hydrophobic composite.

According to still further features in the described preferred embodiments the abrasive agent constitutes between about 0.1 and about 0.5 weight percentages of the hydrophobic composite.

According to another aspect of the present invention there is provided a method of preparing a hydrophobic composite, the method comprising coating a core material with a hydrophobic powder, the hydrophobic powder comprises at least one impure element having a hydrocarbon chain attached thereto, to thereby provide the hydrophobic composite.

According to further features in preferred embodiments of the invention described below, the method further comprising, prior to the coating, applying onto the core material an adherent layer, the adherent layer bonding the hydrophobic powder to the core material.

According to still further features in the described preferred embodiments the step of applying onto the core material an adherent layer comprises admixing the core material with an adherent mixture containing a film-forming agent and a volatile solvent, while removing all of the volatile solvent from the mixture of the core material and the adherent mixture, to thereby provide the core material having applied thereon the adherent layer.

According to still further features in the described preferred embodiments the step of applying onto the core material an adherent layer comprises admixing the core material with an aqueous adherent mixture containing a water-based gluing agent and an aqueous solvent (e.g., water), while removing all of the aqueous solvent from the mixture of the core material and the adherent mixture, to thereby provide the core material having applied thereon the adherent layer.

According to still further features in the described preferred embodiments the method further comprising drying the core material prior to the coating.

According to still further features in the described preferred embodiments the method further comprising drying the core material prior to the admixing.

According to still further features in the described preferred embodiments the method further comprising, after the coating, curing the hydrophobic composite.

According to still further features in the described preferred embodiments the volatile solvent is an organic solvent having a boiling temperature ranging between about 80° C. and about 200° C.

According to still further features in the described preferred embodiments the method further comprising, prior to the coating, admixing the core material with an additive selected from the group consisting of a coloring agent, a UV resistant agent, a bleaching agent and an abrasive agent.

According to still further features in the described preferred embodiments the method further comprising, prior to the coating, admixing the core material having thereon the adherent layer with an additive selected from the group consisting of a coloring agent, a UV resistant agent, a bleaching agent and an abrasive agent.

According to still further features in the described preferred embodiments the core material is selected from the group consisting of a particulate material and a granulate material.

According to still further features in the described preferred embodiments the core material is selected from the group consisting of sand, gravel, slag, porcelanit, dolomite, porcelain, basalt, quartz sand, coal ash, chalk, zeolite, montmorillonite, agapultite, flint, bentonite, perlite, mica, wood chips, nut shells, sawdust and combinations thereof.

According to still further features in the described preferred embodiments the core material has an average particle size ranging between 25 millimeters and 5 microns.

According to still further features in the described preferred embodiments the core material is quartz sand.

According to still further features in the described preferred embodiments the adherent layer constitutes between about 0.5 and about 7 weight percentages of the hydrophobic composite.

According to still further features in the described preferred embodiments the hydrophobic powder constitutes between about 0.1 and about 5 weight percentages of the hydrophobic composite.

According to yet another aspect of the present invention there is provided a hydrophobic particulate comprising a particulated core material coated by a hydrophobic powder, the hydrophobic powder comprises at least one impure element having a hydrocarbon chain attached thereto.

According to further features in preferred embodiments of the invention described below, the hydrocarbon chain comprises at least 10 carbon atoms.

According to still further features in the described preferred embodiments the hydrocarbon is a residue of a fatty acid having at least 12 carbon atoms.

According to still further features in the described preferred embodiments the fatty acid is selected from the group consisting of stearic acid, lauric acid, myristic acid, palmitic acid, oleic acid, linolenic acid and arachidonic acid.

According to still further features in the described preferred embodiments the at least one element is selected from the group consisting of a metallic element, a semi-metallic element, a transition metallic element and combinations thereof.

According to still further features in the described preferred embodiments the at least one element is selected from the group consisting of magnesium, calcium, aluminum, zinc, sodium, barium, zirconium, manganese, titanium, vanadium, chromium, iron and combinations thereof.

According to still further features in the described preferred embodiments the hydrophobic composite and particulate are characterized as being inactive toward alkaline reagents.

According to still further features in the described preferred embodiments the hydrophobic composite and particulate is capable of preventing water adherence thereto and water penetration therein under an external pressure of up to about 4.5 atmospheres.

According to still further features in the described preferred embodiments the hydrophobic composite and particulate is characterized by being durable to dynamic water wear for at least 2 months.

According to still further features in the described preferred embodiments the gluing agent constitutes between about 0.1 and about 50 weight percentages of the adherent layer.

According to still further features in the described preferred embodiments the hydrophobic particulate further comprising at least one additive selected from the group consisting of a coloring agent, a UV resistant agent, a bleaching agent and an abrasive agent.

According to still further features in the described preferred embodiments the coloring agent constitutes between about 0.1 and about 2 weight percentages of the hydrophobic particulate.

According to still further features in the described preferred embodiments the UV resistant agent and the bleaching agent each constitutes between about 0.01 and about 2 weight percentages of the hydrophobic particulate.

According to still further features in the described preferred embodiments the abrasive agent constitutes between about 0.1 and about 0.5 weight percentages of the hydrophobic particulate.

According to still another aspect of the present invention there is provided a method of preparing a hydrophobic particulate, the method comprising coating a particulated core material with a hydrophobic powder, the hydrophobic powder comprises at least one impure element having a hydrocarbon chain attached thereto, to thereby provide the hydrophobic particulate.

According to further features in preferred embodiments of the invention described below, the method further comprising, prior to the coating, applying onto the particulated core material an adherent layer, the adherent layer bonding the hydrophobic powder to the particulated core material.

According to still further features in the described preferred embodiments the step of applying onto the particulated core material an adherent layer comprises admixing the particulated core material with an adherent mixture containing a film-forming agent and a volatile solvent, while removing all of the volatile solvent from the mixture of the particulated core material and the adherent mixture, to thereby provide the particulated core material having applied thereon the adherent layer.

According to still further features in the described preferred embodiments the step of applying onto the particulated core material an adherent layer comprises admixing the particulated core material with an aqueous adherent mixture containing a water-based gluing agent and an aqueous solvent (e.g., water), while removing all of the aqueous solvent from the mixture of the particulated core material and the adherent mixture, to thereby provide the particulated core material having applied thereon the adherent layer.

According to still further features in the described preferred embodiments the method further comprising drying the particulated core material prior to the coating.

According to still further features in the described preferred embodiments the method further comprising drying the particulated core material prior to the admixing.

According to still further features in the described preferred embodiments the method further comprising, after the coating, curing the hydrophobic particulate.

According to still further features in the described preferred embodiments the curing is performed for a time period ranging between 1 and 30 days.

According to still further features in the described preferred embodiments the removing of the volatile solvent is performed by evaporative heating.

According to still further features in the described preferred embodiments the removing of the volatile solvent is performed at room temperature.

According to still further features in the described preferred embodiments the volatile solvent is an organic solvent having a boiling temperature ranging between about 80° C. and 200° C.

According to still further features in the described preferred embodiments the method further comprising, prior to the coating, admixing the particulated core material with an additive selected from the group consisting of a coloring agent, a UV resistant agent, a bleaching agent and an abrasive agent.

According to still further features in the described preferred embodiments the method further comprising, prior to the coating, admixing the particulated core material having thereon the adherent layer with an additive selected from the group consisting of a coloring agent, a UV resistant agent, a bleaching agent and an abrasive agent.

According to still further features in the described preferred embodiments the particulated core material has an average particle size ranging between 25 millimeters and 5 microns.

According to still further features in the described preferred embodiments the particulated core material is quartz sand.

According to still further features in the described preferred embodiments the film forming agent is a film forming polyurethane.

According to still further features in the described preferred embodiments the adherent mixture further comprises a gluing agent.

According to still further features in the described preferred embodiments the gluing agent is a volatile hydrocarbon having at least 12 carbon atoms.

According to still further features in the described preferred embodiments the gluing agent is selected from the group consisting of liquid asphalt, paraffin wax, beeswax, lanolin wax, linseed oil and combinations thereof.

According to still further features in the described preferred embodiments the hydrophobic powder has an average particle size ranging between 0.02 micron and 50 microns.

According to still further features in the described preferred embodiments the hydrophobic powder has a surface area ranging between 1 m$^2$/gram and 60 m$^2$/gram.

According to still further features in the described preferred embodiments the hydrophobic fumed silica constitutes between 1 and 99 weight percentages of the hydrophobic powder.

According to still further features in the described preferred embodiments the adherent layer constitutes between about 0.5 and about 7 weight percentages of the hydrophobic particulate.

According to still further features in the described preferred embodiments the hydrophobic powder constitutes between about 0.1 and about 5 weight percentages of the hydrophobic particulate.

While further conceiving the present invention, it was envisioned that efficient hydrophobic composites, including hydrophobic particulates and hydrophobic free-flowing aggregates, can be prepared by coating a core material with a hydrophobic material that is bonded thereto via a water-based adherent layer, thus avoiding the disadvantageous use of organic film-forming agents and gluing agents.

While reducing the present invention to practice, it was further found that cost-efficient, safely-prepared and environmentally friendly hydrophobic composites can be easily prepared by using a water-adherent layer that bonds the hydrophobic material to the core material, while still achieving the desired characteristics of the resulting composites.

Thus, according to still another aspect of the present invention there is provided a hydrophobic composite comprising a core material coated by a hydrophobic material bonded thereof via a water-based adherent layer.

According to further features in preferred embodiments of the invention described below, the water-based adherent layer comprises a water-based gluing agent.

According to still further features in the described preferred embodiments the water-based gluing agent is a bitumen-latex paste.

According to still further features in the described preferred embodiments the hydrophobic material is selected from the group consisting of a hydrophobic powder comprising at least one impure element having a hydrocarbon chain attached thereto, hydrophobic fumed silica, molten polypropylene and any mixture thereof.

The hydrophobic composite, the core material and the hydrophobic powder, are as described hereinabove.

According to yet another aspect of the present invention there is provided a method preparing the hydrophobic composite described above, which comprises admixing a core material and an aqueous adherent mixture including a water-based gluing agent and an aqueous solvent; removing the aqueous solvent to thereby to thereby provide the core material having applied thereon the water-based adherent layer; and coating the core material having applied thereon the water-based adherent layer with the hydrophobic material, thereby providing the hydrophobic composite.

According to further features in preferred embodiments of the invention described below, the concentration of the water-based gluing agent in the aqueous adherent mixture ranges between about 1 weight percentage and about 99 weight percentages.

According to still further features in the described preferred embodiments the method further comprises drying the core material prior to the admixing.

According to still further features in the described preferred embodiments the method further comprises drying the core material having applied thereon the water-based adherent layer prior to the coating.

According to still further features in the described preferred embodiments the method further comprises, after the coating, curing the hydrophobic composite.

According to still further features in the described preferred embodiments the curing is performed for a time period ranging between 1 and 30 days.

According to still further features in the described preferred embodiments the removing the aqueous solvent is performed by tumble drying.

According to still further features in the described preferred embodiments the method further comprises, prior to the coating, admixing the core material having thereon the water-based adherent layer with an additive selected from the group consisting of a coloring agent, a UV resistant agent, a bleaching agent and an abrasive agent.

According to an additional aspect of the present invention there is provided a free-flowing hydrophobic aggregate capable of repelling a predetermined maximal pressure of liquid, the free-flowing hydrophobic aggregate comprising a plurality of differently sized particulates, wherein at least one of a size distribution of the particulates, a contact angle between the liquid and the particulates and a characteristic distance between adjacent particulates is selected so that when a layer of the free-flowing hydrophobic aggregate is in contact with a liquid having a pressure lower than or equal to the predetermined maximal pressure, percolation of the liquid through the free-flowing hydrophobic aggregate is prevented.

According to further features in preferred embodiments of the invention described below, the layer has a thickness from about 1 cm to about 10 cm and further wherein the predetermined maximal pressure is equivalent to a column of water having a height above 100 cm.

According to still further features in the described preferred embodiments the free-flowing hydrophobic aggregate further comprising inflatable particulates size wise compatible with capillaries formed between the particulates and capable of absorbing the liquid.

According to still further features in the described preferred embodiments a freezing temperature of the inflatable particulates below about −20 degrees centigrade, both in an inflated state and in a deflated state of the inflatable particulates.

According to still further features in the described preferred embodiments the size distribution is selected so that the free-flowing hydrophobic aggregate is characterized by a minimal water absorption capability.

According to still further features in the described preferred embodiments the predetermined thermal properties are selected from the group consisting of thermal conductivity, specific heat capacity and latent heat.

According to still further features in the described preferred embodiments the size distribution is selected so that the free-flowing hydrophobic aggregate is capable of allowing evaporation of the liquid.

According to still further features in the described preferred embodiments the size distribution is proportional to the predetermined maximal pressure.

According to still further features in the described preferred embodiments a cosine of the contact angle is proportional to the predetermined maximal pressure, the contact angle is measured from a tangent to a surface defined by the free-flowing hydrophobic aggregate.

According to still further features in the described preferred embodiments the characteristic distance is inversely proportional to the predetermined maximal pressure.

According to still further features in the described preferred embodiments the plurality of differently sized particulates comprises a particulated core material coated by a hydrophobic powder selected so as to provide the contact angle.

According to still further features in the described preferred embodiments the hydrophobic powder comprises inflatable particulates capable of absorbing the fluid.

According to still further features in the described preferred embodiments a diameter of the inflatable particulates is from about 1 micrometer to about 100 micrometers.

According to still further features in the described preferred embodiments a freezing temperature of the inflatable particulates is below about −20 degrees centigrade, both in an inflated state and in a deflated state of the inflatable particulates.

According to still further features in the described preferred embodiments the inflatable particulates, when in a deflated state, constitute less than 1 percent of the free-flowing hydrophobic aggregate by volume.

According to still further features in the described preferred embodiments the free-flowing hydrophobic aggregate further comprising at least one additive selected from the group consisting of a coloring agent, a UV resistant agent, a bleaching agent and an abrasive agent.

According to yet an additional aspect of the present invention there is provided a hydrophobic brick comprising a protective encapsulation having a predetermined shape, and a free-flowing hydrophobic aggregate being encapsulated in the protective encapsulation.

According to further features in preferred embodiments of the invention described below, the hydrophobic brick further comprising inflatable particulates size wise compatible with capillaries formed between the particulates and capable of absorbing the fluid.

According to still an additional aspect of the present invention there is provided a method of waterproofing a portion of a structure being in contact with a ground, comprising: providing a bed of a free-flowing hydrophobic aggregate; and positioning the structure over or in the bed of the free-flowing hydrophobic aggregate.

According to further features in preferred embodiments of the invention described below, the method further comprising protecting the bed of free-flowing hydrophobic aggregate by enclosing the bed in a protective structure.

According to still further features in the described preferred embodiments a thickness of the bed of free-flowing hydrophobic aggregate is between 1 and 15 cm.

According to still further features in the described preferred embodiments a thickness of the bed of free-flowing hydrophobic aggregate is between 4 and 10 cm.

According to a further aspect of the present invention there is provided a method of waterproofing an underground wall of a structure, comprising providing at least one sidewall of a free-flowing hydrophobic aggregate adjacent to the underground wall of the structure.

According to further features in preferred embodiments of the invention described below, the method further comprising protecting the sidewall of free-flowing hydrophobic aggregate by enclosing the sidewall in a protective structure.

According to still further features in the described preferred embodiments the method further comprising refilling the sidewall of free-flowing hydrophobic aggregate, with time.

According to still further features in the described preferred embodiments the sidewall of the free-flowing hydrophobic aggregate comprises an arrangement of hydrophobic bricks, each being a protective encapsulation having a predetermined shape and encapsulating the free-flowing hydrophobic aggregate.

According to still further features in the described preferred embodiments the method further comprising coating the underground wall of the structure with a waterproofing substance selected from the group consisting of a liquid and a paste.

According to still further features in the described preferred embodiments the structure is an existing structure, and the method is applied as a repair method.

According to still further features in the described preferred embodiments the structure is a new structure, and the method is applied during construction.

According to yet a further aspect of the present invention there is provided a method of waterproofing a floor of a structure, comprising providing a bed of a free-flowing hydrophobic aggregate onto the structure and positioning the floor of the structure over the bed of the free-flowing hydrophobic aggregate.

According to further features in preferred embodiments of the invention described below, the method further comprising protecting the bed of the free-flowing hydrophobic aggregate by enclosing the bed in a protective structure.

According to still further features in the described preferred embodiments the method further comprising embedding a pipe in the bed of the free-flowing hydrophobic aggregate.

According to still a further aspect of the present invention there is provided a method of waterproofing a roof of a structure, the roof having sidewalls, the method comprising: applying a bed of a free-flowing hydrophobic aggregate on the roof; and covering the bed of the free-flowing hydrophobic aggregate, to protect the bed.

According to still further features in the described preferred embodiments the covering comprises applying a floor over the bed of the free-flowing hydrophobic aggregate.

According to still further features in the described preferred embodiments the bed of the free-flowing hydrophobic aggregate comprises an arrangement of hydrophobic bricks, each being a protective encapsulation having a predetermined shape and encapsulating the free-flowing hydrophobic aggregate.

According to still further features in the described preferred embodiments a thickness of the bed of the free-flowing hydrophobic aggregate is between 1 and 15 cm.

According to still further features in the described preferred embodiments a thickness of the bed of the free-flowing hydrophobic aggregate is between 4 and 7 cm.

According to still a further aspect of the present invention there is provided a method of waterproofing a reservoir, the method comprising: placing a flooring bed of a free-flowing hydrophobic aggregate over a base of the reservoir; and placing walls of the free-flowing hydrophobic aggregate over walls of the reservoir; wherein at least one of the flooring bed and the walls of the free-flowing hydrophobic aggregate are covered by a protective structure designed and constructed to maintain the free-flowing hydrophobic aggregate in place.

According to still further features in the described preferred embodiments a thickness of the flooring bed of free-flowing hydrophobic aggregate is between 4 and 15 cm.

According to still further features in the described preferred embodiments the method further comprising mixing the free-flowing hydrophobic aggregate with lightweight aggregates.

According to still further features in the described preferred embodiments the protective structure is selected from the group consisting of tiles, geotechnic fabric, concrete, plastic and combination thereof.

According to still further features in the described preferred embodiments at least one of the flooring bed and the sidewalls of the free-flowing hydrophobic aggregate comprises an arrangement of hydrophobic bricks, each being a protective encapsulation having a predetermined shape and encapsulating the free-flowing hydrophobic aggregate.

According to still further features in the described preferred embodiments the free-flowing hydrophobic aggregate further comprises inflatable particulates size wise compatible with capillaries formed between the particulates and capable of absorbing the fluid.

According to still a further aspect of the present invention there is provided a method of protecting an object buried underground, the method comprising providing a free-flowing hydrophobic aggregate and surrounding the object by a layer of the free-flowing hydrophobic aggregate in a manner such that the layer of the free-flowing hydrophobic aggregate is interposed between the object and the ground.

According to still further features in the described preferred embodiments the size distribution is selected so that a maximal diameter of capillaries formed between the particulates is suitable for repelling the liquid.

According to still further features in the described preferred embodiments the size distribution is selected so that the free-flowing hydrophobic aggregate is characterized by predetermined acoustical isolation ability.

According to still further features in the described preferred embodiments the free-flowing hydrophobic aggregate comprises a particulated core material coated by a hydrophobic powder, the hydrophobic powder comprises at least one impure element having a hydrocarbon chain attached thereto.

According to still further features in the described preferred embodiments the hydrophobic powder comprises inflatable particulates capable of absorbing fluid when being in contact therewith.

According to still further features in the described preferred embodiments the free-flowing hydrophobic aggregate further comprises at least one additive selected from the group consisting of a coloring agent, a UV resistant agent, a bleaching agent and an abrasive agent.

According to still a further aspect of the present invention there is provided a hydrophobic composition for protecting an underground object, comprising a thermally conductive free-flowing hydrophobic aggregate and a dielectric free-flowing hydrophobic aggregate, the thermally conductive free-flowing hydrophobic aggregate and the dielectric free-flowing hydrophobic aggregate being mixed in a predetermined ratio selected so as to electrically isolate the underground object while allowing transportation of heat therefrom.

According to still further features in the described preferred embodiments the hydrophobic composition further comprising inflatable particulates size wise compatible with capillaries formed between particulates of the thermally conductive free-flowing hydrophobic aggregate and/or the dielectric free-flowing hydrophobic aggregate, the inflatable particulates being capable of absorbing fluid.

According to still further features in the described preferred embodiments a freezing temperature of the inflatable particulates below about −20 degrees centigrade, both in an inflated state and in a deflated state of the inflatable particulates.

According to still further features in the described preferred embodiments the hydrophobic composition further comprising at least one additive selected from the group consisting of a UV resistant agent, a bleaching agent and an abrasive agent.

According to still a further aspect of the present invention there is provided a method of protecting an underground object, the method comprising: providing a hydrophobic composition having a thermally conductive free-flowing hydrophobic aggregate and a dielectric free-flowing hydrophobic aggregate; and surrounding the object by a layer of the hydrophobic composition in a manner such that the layer of the hydrophobic composition is interposed between the object and the ground; the thermally conductive free-flowing hydrophobic aggregate and the dielectric free-flowing hydrophobic aggregate being mixed in a predetermined ratio selected so as to electrically isolate the underground object while allowing transportation of heat therefrom.

According to still farther features in the described preferred embodiments the hydrophobic composition further comprises inflatable particulates, size wise compatible with capillaries formed between particulates of the thermally conductive free-flowing hydrophobic aggregate and/or the dielectric free-flowing hydrophobic aggregate, the inflatable particulates being capable of absorbing fluid.

According to still further features in the described preferred embodiments a freezing temperature of the inflatable particulates below about −20 degrees centigrade, both in an inflated state and in a deflated state of the inflatable particulates.

According to still further features in the described preferred embodiments the hydrophobic composition further comprises at least one additive selected from the group consisting of a UV resistant agent, a bleaching agent and an abrasive agent.

According to still a further aspect of the present invention there is provided a method of manufacturing a hydrophobic composition for protecting an underground object, the method comprising providing a thermally conductive free-flowing hydrophobic aggregate; providing a dielectric free-flowing hydrophobic aggregate; and mixing the thermally conductive free-flowing hydrophobic aggregate and the dielectric free-flowing hydrophobic aggregate in a predetermined ratio; the predetermined ratio being selected so as to allow electrical isolation of the underground object and transportation of heat therefrom.

According to still further features in the described preferred embodiments the underground object is selected from the group consisting of an underground electrical cable, an underground electrical wire, an underground communication cable and an underground communication wire.

According to still further features in the described preferred embodiments at least one of the thermally conductive free-flowing hydrophobic aggregate and the dielectric free-flowing hydrophobic aggregate comprises a particulated core material coated by a hydrophobic powder.

According to still further features in the described preferred embodiments the hydrophobic powder has a distinguishable color.

According to still further features in the described preferred embodiments the particulated core material is further coated by a coloring coat.

According to still further features in the described preferred embodiments the coloring coat is water resistant.

According to still further features in the described preferred embodiments the method further comprising mixing the thermally conductive free-flowing hydrophobic aggregate and the dielectric free-flowing hydrophobic aggregate with inflatable particulates being size wise compatible with capillaries formed between particulates of the thermally conductive free-flowing hydrophobic aggregate and/or the dielectric free-flowing hydrophobic aggregate, the inflatable particulates being capable of absorbing fluid.

According to still further features in the described preferred embodiments an absorption capability of the inflatable particulates is from about 100 to about 5000 by weight.

According to still further features in the described preferred embodiments a freezing temperature of the inflatable particulates below about −20 degrees centigrade, both in an inflated state and in a deflated state of the inflatable particulates.

According to still further features in the described preferred embodiments a diameter of the inflatable particulates is from about 1 micrometer to about 1000 micrometers.

According to still further features in the described preferred embodiments the method further comprising mixing the thermally conductive free-flowing hydrophobic aggregate and the dielectric free-flowing hydrophobic aggregate with at least one additive selected from the group consisting of a UV resistant agent, a bleaching agent and an abrasive agent.

According to still further features in the described preferred embodiments the particulated core material is selected from the group consisting of sand, gravel, slag, porcelanit, dolomite, porcelain, basalt, quartz sand, coal ash, chalk, zeolite, montmorillonite, agapultite, flint, bentonite, perlite, mica, wood chips, nut shells, sawdust and combinations thereof.

According to still further features in the described preferred embodiments at least one of the thermally conductive free-flowing hydrophobic aggregate and the dielectric free-flowing hydrophobic aggregate comprises a plurality of differently sized particulates.

According to still further features in the described preferred embodiments at least one of a size distribution of the differently sized particulates, a contact angle between a liquid and the differently sized particulates and a characteristic distance between adjacent particulates is selected so that when a layer of the hydrophobic composition is in contact with a liquid having a pressure lower than or equal to a predetermined maximal pressure, percolation of the liquid through the hydrophobic composition is prevented.

According to still further features in the described preferred embodiments the liquid is water.

According to still further features in the described preferred embodiments the layer has a thickness from about 1 cm to about 10 cm and further wherein the predetermined maximal pressure is equivalent to a column of water having a height above 30 cm.

According to still further features in the described preferred embodiments the size distribution is characterized by a variance ranging from 1 micrometer to 1400 micrometer.

According to still further features in the described preferred embodiments the size distribution is selected so that a maximal diameter of capillaries formed between the particulates is suitable for repealing the predetermined maximal pressure of the liquid.

According to still further features in the described preferred embodiments the size distribution is selected so that a maximal diameter of capillaries formed between the particulates is from 1 nanometer to 500 nanometers.

According to still a further aspect of the present invention there is provided a method of preparing an area for plants cultivating, comprising providing a bed of a free-flowing hydrophobic aggregate onto the area and covering the bed of a free-flowing hydrophobic aggregate by a layer of soil, thereby preparing an area for plants cultivating.

According to still further features in the described preferred embodiments the bed of the free-flowing hydrophobic aggregate comprises an arrangement of hydrophobic patches, each being a protective encapsulation having a predetermined shape and encapsulating the free-flowing hydrophobic aggregate.

According to still further features in the described preferred embodiments the protective encapsulation is made from a degradable material.

According to still further features in the described preferred embodiments the hydrophobic patches are arranged such that at least one space is formed between adjacent hydrophobic patches.

According to still further features in the described preferred embodiments the method further comprising covering the bed of the free-flowing hydrophobic aggregate by a super absorbent polymer.

According to still further features in the described preferred embodiments the method further comprising positioning at least one water collection channel for allowing conveyance of water into the soil.

According to still further features in the described preferred embodiments the method further comprising surrounding the layer of soil by a protective barrier.

According to still further features in the described preferred embodiments the protective barrier comprises the free-flowing hydrophobic aggregate.

According to still a further aspect of the present invention there is provided a plant cultivating method, comprising: providing a bed of a free-flowing hydrophobic aggregate an area; covering the bed of a free-flowing hydrophobic aggregate by a layer of soil; planting a plant in the layer of soil; and applying aqueous liquid under the bed of a free-flowing hydrophobic aggregate thereby cultivating the plant.

According to further features in preferred embodiments of the invention described below, the aqueous liquid is salty water.

According to still further features in the described preferred embodiments the method further comprising positioning at least one water collection channel for allowing conveyance of water under the bed of the free-flowing hydrophobic aggregate.

According to still a further aspect of the present invention there is provided a method of preparing a salt-free area on a salty soil, comprising providing a bed of a free-flowing hydrophobic aggregate onto the salty soil and covering the bed of the free-flowing hydrophobic aggregate by non-salty soil, thereby preparing the salt-free area.

According to still further features in the described preferred embodiments the further comprising mixing the free-flowing hydrophobic aggregate with lightweight aggregates.

According to still further features in the described preferred embodiments the method further comprising covering the bed of free-flowing hydrophobic aggregate by a super absorbent polymer.

According to still further features in the described preferred embodiments the bed of free-flowing hydrophobic aggregate is designed and constructed to facilitate desalination of non-desalted water present thereunder, the desalination being effected by passage of desalted vapors of the non-desalted water through the bed of the free-flowing hydrophobic aggregate.

According to still further features in the described preferred embodiments the free-flowing hydrophobic aggregate comprises a plurality of differently sized particulates, and further wherein at least one of a size distribution of the particulates, a contact angle between a liquid and the particulates and a characteristic distance between adjacent particulates is selected so that when the free-flowing hydrophobic aggregate is in contact with a liquid having a pressure lower than or equal to a predetermined maximal pressure, percolation of the liquid through the free-flowing hydrophobic aggregate is prevented.

According to still further features in the described preferred embodiments the method further comprising inflatable particulates size wise compatible with capillaries formed between the particulates and capable of absorbing the fluid.

According to still further features in the described preferred embodiments the inflatable particulates, when in a deflated state, constitute less than 2 percent of the free-flowing hydrophobic aggregate by volume.

According to still further features in the described preferred embodiments the inflatable particulates comprise a super absorbent polymer.

According to still further features in the described preferred embodiments the inflatable particulates comprises sodium being cross linked with polyacrylic acid.

According to still further features in the described preferred embodiments the inflatable particulates comprises anti-caking agent.

According to still further features in the described preferred embodiments the size distribution is selected so that the free-flowing hydrophobic aggregate is characterized by a predetermined specific weight.

According to still further features in the described preferred embodiments the size distribution is selected so that the free-flowing hydrophobic aggregate is characterized by a minimal absorption capability.

According to still further features in the described preferred embodiments the size distribution is selected so that the free-flowing hydrophobic aggregate is characterized by predetermined thermal properties.

According to still further features in the described preferred embodiments the size distribution is selected so that the free-flowing hydrophobic aggregate is capable of allowing evaporation of liquid.

In any of the aforementioned aspects of the present invention, the free-flowing hydrophobic aggregate preferably comprises one or more of the hydrophobic composites described hereinabove.

The present invention successfully addresses the shortcomings of the presently known configurations by providing hydrophobic composites and particulates, having properties far exceeding prior art, and suitable for being implemented in various applications. Additionally, the present invention successfully addresses the shortcomings of the presently known manufacturing methods by providing methods of producing the hydrophobic composites and particulates.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIGS. 2A-B schematically illustrate prior-art methods of waterproofing a foundation of a house;

FIGS. 4A-B schematically illustrate a hydrophobic brick and a hydrophobic brick wall, in accordance with a preferred embodiment of the present invention;

DESCRIPTION OF THE PREFERRED EMBODIMENTS

Figure 1:
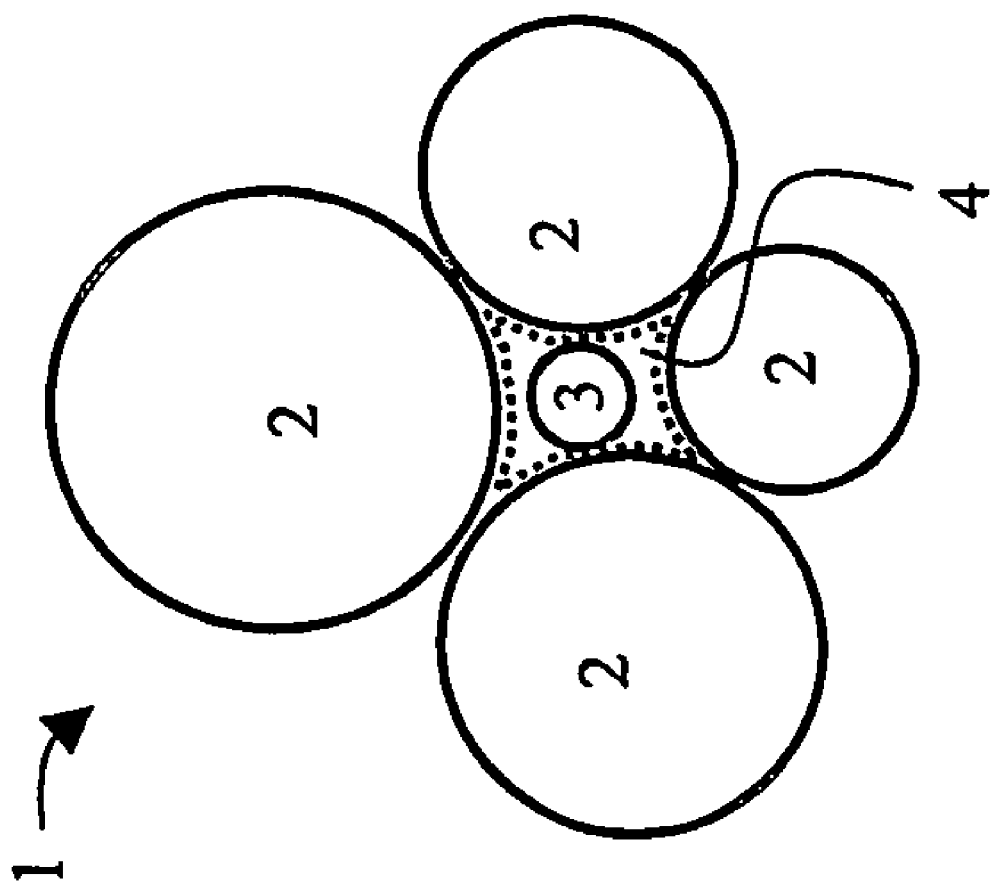
FIG. 1 schematically illustrates a free-flowing hydrophobic aggregate, having a plurality of differently sized particulates, in accordance with a preferred embodiment of the present invention.

The present invention is of novel hydrophobic composites and particulates that have superior chemical and physical performances, which can be beneficially used in various waterproofing and oil-absorbing applications, and of methods of their production. The present invention is further of the use of free-flowing hydrophobic aggregate while providing protection to the free-flowing aggregates from wind and water erosion. Specifically, the hydrophobic composites, particulates and free-flowing hydrophobic aggregate of the present invention comprise a core and coating compositions which render the resulting product durable toward a myriad of parameters encountered in water-proofing and desalination applications such as, for example, high water pressures, wear, reactive detergents and more. The hydrophobic composites, particulates and free-flowing hydrophobic aggregate of the present invention are manufacturable far cost effectively as compared with the prior art hydrophobic composites described in the background section above.

The principles and operation of the hydrophobic composites, particulates, free-flowing hydrophobic aggregate and the methods utilizing same according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

As is discussed in the Background section hereinabove, the presently known hydrophobic composites are limited by both their performance and their effectiveness. For example, the hydrophobic composites disclosed by Craig, in U.S. Pat. No. 4,474,852, were found incapable of withstanding water pressures higher than 2-3 cm and hence cannot be practically used in various common waterproofing applications, such as for example, as a coat of water reservoirs and as a gravel fill or ballast for road beds or sidewalks, where water-repellency under high pressures is required. The hydrophobic composites disclosed in WO 03/044124 include a hydrophobic coating that is consisted essentially of hydrophobic fumed silica, which is both highly expensive and render the composite's surface acidic and hence susceptible to reactive detergents. Such hydrophobic composites, apart from being economically inefficient, and are typically further characterized as environmentally unfriendly, cannot be efficiently used in various applications such as topcoats of various surfaces.

In a search for hydrophobic composites, particulates and free-flowing aggregate with improved performances, the present inventor has found that the use of a hydrophobic powder of one or more impure elements having one or more hydrocarbons attached thereto, optionally in combination with the commercially available hydrophobic fumed silica, can be prepared in an environmental-friendly and economically-efficient process and exert superior water-repellency as well as durability toward parameters such as high water pressures, dynamic water wear and reactive detergents.

Hence, according to one aspect of the present invention there is provided a hydrophobic composite which comprises a core material coated by a hydrophobic powder, the powder comprises one or more impure elements having a hydrocarbon chain attached thereto. As further detailed hereinunder, depending on the shape of the core material, the hydrophobic powder can also be used for providing hydrophobic particulates and, more preferably, a hydrophobic free-flowing aggregate.

As used herein, the phrase "impure element" includes chemical elements of the periodic table which are not used in their pure form. The impure elements can be naturally impure elements such as, for example, oxidized elements or carbonated elements or can be pure or impure elements which have been further impurified by, for example, small quantities of other elements and/or various organic substances. The impurity of the element(s) is required so as to render the element susceptible to a surface reaction with an organic substance bearing the hydrocarbon chain, as is further detailed hereinbelow.

The selected elements are preferably metallic, semi-metallic or transition metallic elements. Representative examples of preferred elements that are usable in context of the present invention, in an impure form, include, without limitation, magnesium, calcium, aluminum, zinc, sodium, barium, zirconium, manganese, titanium, vanadium, chromium, iron and combinations thereof. The elements are selected according to the desired application of the final hydrophobic product. For example, hydrophobic powder that includes impure calcium, magnesium and/or zinc bearing a hydrocarbon chain is preferable in cases where the final product is used for building and construction applications.

As used herein, the phrase "hydrocarbon chain" describes a chain of carbon atoms that are covalently attached therebetween and are substituted by hydrogen atoms. The hydrocarbon chain can be linear or branched, saturated or unsaturated chain and therefore can be in he form of alkylene chains that are optionally interrupted or substituted by, for example, one or more aryl groups. The hydrocarbon chain of the present invention includes at least 10 carbon atoms, preferably at least 12 carbon atoms or more, e.g., 13, 14, 15, 16, 17, 18, 19, 20 or more carbon atoms. Evidently, such a hydrocarbon chain is highly hydrophobic and therefore, when used for coating, renders the powder hydrophobic.

The hydrocarbon chain can be attached to the impure element(s) via various interactions such as electrostatic interactions and Van der Vaals interactions. However, the hydrocarbon chain is preferably covalently attached to the element(s), to thereby form a hydrophobic derivative of the element.

Hence, a preferred hydrocarbon chain according to the present invention is a residue of a hydrophobic organic substance that is capable of reacting with the impure element(s). Such an organic substance has a functional group that can react with the surface of an impure element, the functional group is connected to the hydrocarbon chain.

A representative example of such an organic substance is a fatty acid that has at least 12 carbon atoms. Fatty acids can react with various functional groups that are present on the impure elements' surface via its carboxylic end, to thereby provide the hydrophobic derivative described above. Representative examples of fatty acids that are usable in context of the present invention include, without limitation, stearic acid, lauric acid, myristic acid, palmitic acid, oleic acid, linolenic acid and arachidonic acid.

Hence, the hydrophobic powder of the present invention preferably includes an impure element or a mixture of impure elements, as is defined hereinabove, whereby the selected impurity renders the surface of the element(s) susceptible to chemically reacting with the organic substance described above, which have been reacted with the organic substance to thereby provide the impure element(s) having the hydrocarbon residue of the organic substance covalently attached thereto.

A representative example of a hydrophobic powder that is usable in context of the present invention therefore includes, without limitations, a powder obtained by surface reaction of oxidized element(s) (e.g., colloidal particles of calcium oxide, magnesium oxide and the like), which bear free hydroxyl groups on their surfaces, and a fatty acid such as, for example, stearic acid. The free hydroxyl groups react with the carboxylic group of the fatty acid, so as to form the corresponding ester.

Another representative example of a hydrophobic powder that is usable in context of the present invention include, without limitations, a powder obtained by surface reaction of a carbonated element (e.g., calcium carbonate), which is further impurified with oxidized elements such as magnesium oxide and iron oxide, as well as other substances such as, for example, silicates and sulfates, and a fatty acid as is described hereinabove.

It should be noted, however, that a powder prepared by reacting the surface of calcium carbonate, which have been further impurified, with stearic acid, is commercially available (for example, from Kfar-Gilaadi Quarries, Israel). However, this powder has never been used as a hydrophobic powder and is presently used only in the pharmaceutical industry as well as in the plastic industry.

The hydrophobic powder of the present invention is typically characterized by a surface area ranging between 1 $m^2$/gram and 20 $m^2$/gram. However, in cases where higher surface area is required, the hydrophobic powder can be grinded so as to enhance the surface area up to more than 50 $m^2$/gram (e.g., 60 $m^2$/gram). It should be noted in this respect that the presently known hydrophobic coatings, e.g., the hydrophobic coatings described in U.S. Pat. No. 4,474,852 and in WO 03/044124, are characterized by surface areas of about 50 $m^2$/gram. While some other superhydrophobic powders has a surface area of up to 250 $m^2$/gram, it has been shown herein that a hydrophobic powder having a surface area of about 60 $m^2$/gram is highly efficient due to other physical parameters (e.g., air entrapment, as is detailed hereinbelow) as well as its low cost.

Due to its particular chemical structure, the hydrophobic powder of the present invention exerts "soap-like" properties and hence it is further characterized as being inactive toward alkaline reagents, such as detergents. Once again it should be noted in this respect that the presently known hydrophobic coatings that are based on hydrophobic colloidal oxides are characterized as being susceptible to such reagents and hence cannot be used in applications that involve the use of detergents.

The hydrophobic powder of the present invention has an average particles size ranging between 0.02 micron and 50 microns, preferably between 0.1 micron and 20 microns, and more preferably between 0.1 micron and 10 microns.

As is demonstrated in the Examples section the follows, hydrophobic composites coated by the hydrophobic powder of the present invention are characterized by high water-repellency performance. However, as is detailed hereinunder, in some cases the use of a combination of the hydrophobic powder of the present invention and hydrophobic fumed silica can be beneficial.

Thus, according to an embodiment of the present invention, the hydrophobic powder further comprises hydrophobic fumed silica.

As used herein, the phrase "hydrophobic fumed silica" describes a colloidal form of silica made by combustion of silicon tetrachloride in hydrogen-oxygen furnaces, in which individual particles on the surface thereof have been chemically bonded to hydrophobic trimethoxysiloxyl groups. Hydrophobic fumed silica is a commercially available powder typically having an average particles size smaller than 1 micron and, if present in the hydrophobic powder of the present invention, it can constitute between 1 and 99 weight percentages of the powder. The resulting mixed powder typically has an average particle size of between 0.02 micron and 20 microns.

Hence, hydrophobic composites according to the present invention may include a core material that is coated by a combination of the hydrophobic powder described hereinabove and hydrophobic fumed silica, whereas the partial amount of each of these powders is predetermined either by the selected core material and/or by the intended use of the final product. For example, in applications that require high water repellency, the hydrophobic composite or particulates should have smaller particles size and hence the mixed powder should consist a higher amount of the hydrophobic fumed silica. In applications that require lower water-repellency, the hydrophobic composite or particulates can have larger particles size and hence the mixed powder consists a higher amount of the hydrophobic powder described hereinabove. The use of a minimal amount of hydrophobic fumed silica is highly advantageous as it substantially reduces the cost of the final product.

In any event, the hydrophobic powder of the present invention, alone or in combination with hydrophobic fumed silica, constitutes between about 0.1 and 5 weight percentages of the hydrophobic composite, whereby powders that include higher amount of the hydrophobic powder described hereinabove constitute between about 2 and about 5 weight percentages of the composite and powders that include higher amount of the hydrophobic fumed silica constitute between about 0.1 and about 2 weight percentages of the composite.

As used herein throughout, the term "about" refers to ±10%.

The core material coated by the hydrophobic powder of the present invention may be selected from a wide variety of organic and inorganic substances, with inorganic substances (e.g., minerals) being favored from standpoint of cost and availability.

The physical form of the core material may vary, with particulate and granulate material being preferred. Preferred core materials have an average particles size ranging between about 25 millimeters (25,000 microns) and 5 microns, more preferably between 10 millimeters and 20 microns, more preferably between 5 millimeters and 100 microns and most preferably between 1,000 microns and 200 microns. Such a core material is also referred to herein throughout as aggregate. Non-particulated, non-granulated, integral core materials are also within the scope of the present invention.

Representative examples of core materials that are preferably usable in context of the present invention include, without limitation, sand, gravel, slag, porcelanit, dolomite, porcelain, basalt, quartz sand, coal ash, chalk, zeolite, montmorillonite, agapultite, flint, bentonite, perlite, mica, wood chips, nut shells, sawdust and combinations thereof.

A representative example of a preferred core material according to the present invention is quartz sand having a particle size of between 600 and 800 microns.

The hydrophobic composite of the present invention preferably further comprises an adherent layer, which bonds the hydrophobic powder to the core material. The adherent layer serves as a first coat layer deposited on the core material, which anchors the hydrophobic outer coat thereto.

The adherent layer preferably comprises a film forming agent such as a film forming polyurethane. Any of the film-forming polyurethanes commonly employed in the field of coatings may be used in the practice of the present invention. Included in this category are the well-known two-component and one-component polyurethane coating systems. The two-component systems are formed by the reaction of an aliphatic or aromatic isocyanate with a hydroxyl-bearing compound, such as polyfunctional polyesters based on adipic acid, phthalic anhydride, ethylene glycol and trimethylolpropane, for example. Representative of the one-component polyurethane coating systems that may be employed as the adherent layer are those derived from stable isocyanate-terminated prepolymers formed from an aliphatic or aromatic isocyanate and polyfunctional polyether or polyester. These one-component systems are commonly referred to as "moisture cured" polyurethane coatings because drying results from the reaction of the free-isocyanate groups of the pre-polymer with water or atmospheric moisture. Another one-component polymer coating which may be used in the preparation of the hydrophobic composites is the "urethane oil" or "uralkyd", which is the reaction product of a diisocyanate with a hydroxyl-containing drying oil derivative, e.g., that produced by alcoholysis of an unsaturated glyceride with a polyol, such as trimethylolpropane.

The adherent layer of the present invention may further comprise a gluing agent in combination with the film-forming agent, so as to provide an increase in the anchoring quality of the adherent layer over a longer period of time and an increased attraction for oil and oil related products. Hence, the presence and the relative amount of the gluing agent depend on the need of such properties, in accordance with the intended application of the final product.

The gluing agent preferably comprises a volatile hydrocarbon that has at least 12 carbon atoms, such as, for example, asphalt.

As used herein, the term "asphalt" describes a dark brown to black cementitious material in which the predominate constituents are bitumens that occur in nature or are obtained in petroleum processing, the latter being preferred, primarily because of its greater availability. The asphalt may be solid, semi-solid or liquid, with the latter being preferred.

However, other gluing agents, such as, for example, paraffin wax, beeswax, lanolin wax, linseed oil and any other commercially available wax, can be used in this context of the present invention, though their relative amount in the adherent mixture is preferably lower than that of the asphalt.

More preferably, as is detailed hereinbelow, the adherent layer is a water-based adherent layer, preferably comprising a water-based gluing agent.

The adherent layer of the present invention preferably constitutes between about 0.5 and about 7 weight percentages of the hydrophobic composite, more preferably between 1 and 5 weight percentages of the hydrophobic composite, depending on the particles size of the core material, the selected process of preparing the hydrophobic composite, particulate or free-flowing aggregate and the intended application of the final product. For example, in cases where the core material has an average particles size ranging between 150 microns and 1000 microns, a smaller amount of the adherent layer, e.g., between 0.5 and 1 weight percentage of the hydrophobic composite, is used. In cases where the core material has particles larger than 1000 microns or smaller than 150 microns, a higher amount of the adherent layer is preferred. As is discussed in detail and is further exemplified in the Examples section that follows (see, Examples 5 and 9), using a higher amount of the adherent layer (e.g., more than 1 weight percentage of the composite, preferably 2 weight percentages) results in composites enriched with "free particles", which are characterized by enhanced resistance to dynamic wear. Also, higher amount of adherent layer (e.g., between 3 and 7 weight percentages of the composite) is required in cases where the hydrophobic composite is prepared in a "cold" process, as is detailed hereinbelow.

As is further described and exemplified in the Examples section that follows (see, Example 10), the required amount of the adherent layer may be predetermined.

The adherent layer of the present invention is easily applied to the core materials by dissolving the film-forming agent and the gluing agent, if present, in a volatile solvent, so as to form a homogeneous composition and to provide a uniform deposition of the adherent layer over the surfaces of the core materials. As is described in detail hereinbelow, such an adherent layer mixture is mixed with the core material while the volatile solvent is evaporated.

Preferred compositions of the adherent layer mixture include a film-forming polyurethane in an amount ranging between 5 and 25 weight percentages of the adherent layer mixture, depending on the size and type of the core material; a gluing agent in an amount ranging between 0 and 25 weight percentages of the adherent layer mixture, depending on the core material used, the gluing agent used and the intended use of the final product; and a volatile solvent in an amount of between 50 and 95 weight percentages of the mixture, depending on the amounts of the other components.

As the volatile solvent merely functions as a vehicle for depositing the adherent layer on the core materials, virtually any volatile solvent in which the components of the adherent layer are soluble may be used. However, preferred solvents include petroleum distillates, such as mineral spirits or paint thinner, which have a boiling temperature of between about 80° C. and about 200° C. A representative example of a preferred volatile solvent is toluene, which is readily evaporated at relatively low temperatures and results in rapid spread of the mixture onto the core materials.

Optionally and preferably, a water-based adherent layer is easily applied to the core materials by dissolving a water-based gluing agent in an aqueous solvent, preferably water, so as to form a homogeneous composition and to provide a uniform deposition of the adherent layer over the surfaces of the core materials. As is described in detail hereinbelow, such an aqueous adherent layer mixture is mixed with the core material and is thereafter tumble dried so as to remove the aqueous solvent.

The hydrophobic composites of the present invention can further comprise various additives which, in accordance with the intended application and the core material used, provide hydrophobic composites with improved characteristics. Representative examples of such additives include, without limitations, coloring agents, UV resistant agents, bleaching agents and abrasive agents.

Coloring agents that are usable in context of the present invention include any of the presently known mineral or organic coloring agents, with mineral coloring agents being preferred. A preferred amount of the coloring agent added to the composite ranges between about 0.1 and 2 weight percentages of the hydrophobic composite.

The resulting colored hydrophobic composites may be beneficially used in various applications, such as applications that require easy identification of the hydrophobic composite or applications that involve external coating. A representative example of such an application is the use of colored hydrophobic sand to mark submerged cables, so as to warn against excavation nearby. The addition of a coloring agent to the hydrophobic composite is further beneficial as it can sometimes improve the surface tension of the composite, thus rendering it more hydrophobic.

UV resistant agents are added to the hydrophobic composites of the present invention in order to improve the durability of the composites against UV irradiation, and are hence particularly useful in high radiation geographical sites, e.g., for top-coats of roofs or other surfaces. Representative examples of UV resistant agents that are usable in context of the present invention include, without limitation, titanium dioxide and zinc oxide, both may also serve as bleaching agents. A preferred amount of the UV resistant agent and the beaching agent added to the composite ranges between about 0.01 and 2 weight percentages of the hydrophobic composite.

Abrasive agents are typically added to the hydrophobic composite in order to improve the wear resistance of the composites and are therefore typically used in applications where the composites are exposed to continuous wear. Representative examples of abrasive agents that are usable in context of the present invention include, without limitation, powdered abrasives such as titanium dioxide and aluminium oxide ($Al_2O_3$, corundum). A preferred amount of the abrasive agent added to the composite ranges between about 0.1 and 0.25 weight percentages of the hydrophobic composite.

The hydrophobic composites of the present invention are therefore comprised of a core material, as is described hereinabove, which is coated by the hydrophobic powder described hereinabove, preferably in combination with hydrophobic fumed silica, and preferably further include an adherent layer, as is described hereinabove. Optionally, the hydrophobic composites of the present invention further comprise additives for improving their properties in accordance with their intended application.

A representative example of a hydrophobic composite according to the present invention is quartz sand coated by a mixture of the hydrophobic powder described herein and hydrophobic fumed silica, in a ratio that ranges between 20:1 and 2:1, whereby this hydrophobic mixture is bonded to the sand via an adherent layer.

The hydrophobic composites of the present invention are superior to the presently known composites as they include inexpensive and available materials, they are characterized as inactive toward alkaline reagents such as detergents, and, as is demonstrated in the Examples section that follows, they exert superior water-repellency and are further characterized as being capable of preventing water adherence thereto and water penetration therein under an external pressure of at least 2 atmospheres and up to almost 5 atmospheres, and as being highly durable toward dynamic water wear, namely, as remaining hydrophobic under continuous dynamic water wear for at least two months.

The hydrophobic composites of the present invention can therefore be utilized in a myriad of applications, such as, but not limited to, as waterproofing agents in building and pavement construction, as fill or bed materials under concrete slabs or as wall coatings, both below and above ground, as gravel fill or ballast for road beds or sidewalks, as top coats on paved surfaces, in top hole repairs in roadways, as substitutes for common aggregates in asphalt roofing or shingles, or in built-up roofing. In addition, these hydrophobic composites may be applied to painted surfaces to provide a durable, waterproof finish over wood, metal, concrete, stone, brick, and certain synthetic substrates.

Further according to the present invention, there is provided a method of preparing the hydrophobic composites described above. In general, the method is effected by coating a core material, as is described hereinabove, with the hydrophobic powder of the present invention, optionally in combination with hydrophobic fumed silica. The amount of the hydrophobic powder and the relative amount of the hydrophobic fumed silica are predetermined as is discussed hereinabove. In cases where a mixture of the hydrophobic powder and the hydrophobic fumed silica is applied, the mixture is prepared is a separate vessel prior to applying thereof to the core material.

In cases where the composite further comprises an adherent layer that bonds the hydrophobic powder to the core material, the method further comprises, prior to coating with the hydrophobic powder, applying onto the core material such an adherent layer, and, more specifically, admixing a pre-prepared adherent layer mixture that contains a film forming agent, a volatile solvent and optionally a gluing agent, as is described hereinabove, with the core material, while removing all of the volatile solvent from the resulting mixture, so as to provide a core material having the adherent layer applied thereon.

Optionally and preferably, the adherent layer is a water-based adherent layer and the method further comprises, prior to coating with the hydrophobic powder, applying onto the core material such an adherent layer, and, more specifically, admixing a pre-prepared adherent layer mixture that contains a water-based gluing agent and an aqueous solvent, as is described hereinabove, with the core material, while removing all of the aqueous solvent from the resulting mixture, so as to provide a core material having the water-based adherent layer applied thereon.

As is described in detail in the Examples section that follows, the adherent layer mixture is prepared by mixing its components under heat and is preferably added to the core material while hot. The relative amount of each component in the mixture is predetermined as is discussed hereinabove, while the total amount of the required adherent layer can be also predetermined, as is described and exemplified in the Examples section that follows.

The removal of the volatile solvent is typically performed by evaporative heating, but can alternatively be performed at room temperature.

Hence, the entire process can be performed under heat or alternatively can be performed as a "cold" process, whereas no external heat is applied, as is exemplified in the Examples section that follows. The "cold" process typically involves higher amount of the adherent layer.

In any event, as the core material should contain no more than 1 weight percentage moisture, so as to ensure uniform coatings of the particles, the core material is preferably dried to this extent prior to the coating procedure. The core material is typically dried at a temperature ranging between 90° C. and 120° C., preferably at about 104° C. Upon being dried, the core material can be used hot or can be stored in a closed vessel and be thereafter coated while cold.

Once the hydrophobic composite has been prepared, it is preferably cured so as to obtain the final product. The curing time typically ranges between 1 and 30 days, depending on the composition of the hydrophobic powder. For example, in cases where only the hydrophobic powder of the present invention is used, a curing time of 30 days is required. In cases where the hydrophobic powder is in combination with hydrophobic fumed silica, the curing time is shortened proportionally to the relative amount of the hydrophobic fumed silica, and down to 1 day.

The use of water-based reagents or mixtures in preparing hydrophobic composites, as well as in other applications, has recently become highly intriguing, particularly in view of new environmental regulations and other limitations associated with organic reagents, solutions or mixtures.

While processes performed in organic solvents are considered highly disadvantageous in terms of cost, simplicity, safety, hazardousness and environmental considerations, process performed in aqueous solutions in general, and in water in particular, are completely devoid of these disadvantages.

Thus, preparation of hydrophobic composites, which involves that use of water-based adherent layer and thus uses aqueous solutions as the main preparation medium, is highly beneficial as it is cost-effective, safe, uses a simplified system and is environmentally friendly.

However, the use of water-based reagents or mixtures for binding a hydrophobic material, which is aimed at repelling water, as in the case of the compositions of the present invention, is highly intrinsic.

The present inventors have surprisingly found that hydrophobic composites which include a core material and a hydrophobic material bonded thereto via a water-based adherent layer can be easily prepared, while still achieving the desired characteristics of the resulting hydrophobic composites. As is discussed hereinabove, such hydrophobic composites are highly advantageous since they involve the use of a cost-effective, easy to handle, safe and environmentally friendly aqueous medium.

Hence, according to another aspect of the present invention there is provided a hydrophobic composite comprising a core material coated by a hydrophobic material, whereby the hydrophobic material is bonded to the core material via a water-based adherent layer.

In order to provide a water-based adherent layer which will effectively bind a hydrophobic material to a core material, two requirements should be met: (i) the core material having applied thereof a water-based adherent layer must be effectively dried, so as to provide a substantially water-free adherent layer, prior to its coating with the hydrophobic material; and (ii) the adherent layer should retain its tackiness (its gluing property) in its substantially dried form, so as to allow efficient binding of the hydrophobic material thereto.

In addition, since the hydrophobicity of the resulting composites depends on the contact angle, as described hereinbelow, and farther since the contact angle depends on the physical entrapment of air within the composites, it is highly desirable to select an adherent layer which enables the formation of a physical structure of the hydrophobic layer that entraps as much air as physically possible.

An appropriate and efficient water-based adherent layer is therefore selected so as to meet the above requirements, as well as ease of use, cost, other physical requirements and its interaction with the selected hydrophobic coating material.

A water-based adherent layer, according to the present invention, can be used in any hydrophobic composite, regardless of the core material and the hydrophobic material. Nevertheless, appropriate and efficient hydrophobic coating materials are selected in accordance with the required physical properties of the final composite (e.g., shape), as is detailed herein, as well as in accordance with its interaction with the selected water-based adherent layer.

The water-based adherent layer according to the present invention preferably comprises a water-based gluing agent, which can be selected from a wide variety of commercially available water-based gluing agents.

Representative examples of commercially available water-based gluing agents include, without limitation, Bitumen-Latex and Bitumen-Polymer binders such as Bitumflex (by Bitum, Israel), Elastopaz and Elastobrush (by Pazkar, Israel), Specef 10 and Specef 52 (by Wacker, Germany), Dispercoll c, Dispercoll u, Dispercoll s and Desmodur d (by Bayer, Germany), Enimort, Hiniplast and Hidropren 40-20 (by Enecol, Spain) and many more.

While these gluing agents are widely recognized in the art, they have never been practiced before as an adherent layer that binds hydrophobic material to a core material, particularly a particulated core material, to thereby produce a hydrophobic composite.

The water-based bitumen binders are collectively referred to herein as a bitumen-latex paste. The water-based gluing agent, according to the present invention, preferably include one or more water-based gluing agent(s), optionally and preferably selected from the commercially available water-based gluing agents listed above.

The water-based adherent layer is easily applied onto a core material by simply dissolving it in water, or in any other aqueous medium, and applying the resulting mixture onto the core material. The resulting core material should thereafter be substantially dried, as is described hereinabove. The drying is preferably performed by heating the core material as described herein, optionally and preferably, in combination with a blower or any other technique that may accelerate and enhance the drying process at this stage.

The core material used can be any core material, and is preferably a core material as described hereinabove.

The hydrophobic material can be, for example, the hydrophobic powder described hereinabove, alone or in combination with hydrophobic fumed silica, hydrophobic fumed silica per se or any other silicon-based hydrophobic powder, molten polypropylene and other hydrophobic polymers, as well as any other hydrophobic material or superhydrophobic powder usable in hydrophobic composites, and any combination of the forgoing.

Following are descriptions of applications for which the hydrophobic composite and particulates described above can be employed, according to preferred embodiments of the present invention.

Hence, as stated, the hydrophobic composite of the present invention can be used for manufacturing a free-flowing hydrophobic aggregate, referred to herein as aggregate 1, having enhanced waterproofing properties. Aggregate 1 is capable of repealing a predetermined maximal pressure of liquid. As further detailed hereinunder, by judiciously selecting several parameters of aggregate 1, a layer of the aggregate of relatively small thickness (of the order of centimeters) is sufficient to withstand a column of water or any other liquid of interest. According to a preferred embodiment of the present invention, the column is above 30 cm in height, more preferably above 100 cm in height, most preferably above 10 m in height. A typical thickness of the layer is from about 1 cm to about 20 cm.

The ability of any hydrophobic material to repeal water basically depends on the surface tension of the liquid being in contact with the hydrophobic material. In any liquid, the cohesive forces between molecules present deep in the liquid are shared with all neighboring atoms. The surface molecules of the liquid have no neighboring atoms of the same type above and exhibit stronger cohesive forces upon the molecules directly associated with them on the surface. From a macroscopic point of view, the enhanced intermolecular interaction at the surface of the liquid is observed as the surface tension of the liquid.

The cohesive forces between like molecules compete with external forces existing between the molecules of the liquid and molecules of the material contacting the liquid. When this material is hydrophobic, the cohesive forces significantly dominate, the free surface of the liquid becomes film-like and the liquid is incapable of wetting the hydrophobic material.

Referring now to the drawings, FIG. 1 is a schematic illustration of aggregate 1, which preferably comprises a plurality of differently sized particulates 2 characterized by several (specifically selected) parameters which influence the level of the external forces and thereby the hydrophobic properties of the aggregate. These parameters includes, but are not limited to, a size distribution, M, of particulates 2, a contact angle, $\theta$, defined between the liquid and particulates 2 and a characteristic distance, r, defined between adjacent particulates.

M, $\theta$ and r are preferably selected depending on the waterproofing application for which the aggregate is designed to be used, and in accordance with the maximal liquid pressure expected in the specific application. More specifically, M and the cosine of $\theta$ are preferably proportional to the pressure and r is preferably inversely proportional to the pressure. Mathematically, the relation between the maximal pressure, P, and the above parameters may be expressed using the following empirical formula:

$$P = kM \cos \theta / r, \qquad (EQ. 1)$$

where k is a constant of the proportionality and the angle, $\theta$, is measured from the tangent to a surface defined by the layer of the free-flowing aggregate. One ordinarily skilled in the art would appreciate that only when the right-hand-side of Equation 1 is positive, the aggregate is wetted by the liquid which may then percolate there through. Thus, according to a preferred embodiment of the present invention, $\cos \theta$ is negative so that the aggregate remains dry at all times. This can be achieved by selecting $\theta$ to be from 90° to 180°, where larger values of $\theta$ within this range correspond to larger pressure under which the aggregate remains dry and vise versa.

The contact angle, $\theta$, depends on the materials from which the hydrophobic aggregate of the present invention is made. A detailed description of materials which were found to be suitable to various waterproofing applications is provided hereinafter.

A non-uniform size distribution allows for better control on the capillary size of aggregate 1. Capillary size is a measure of the diameter of capillaries formed between the particulates of the aggregate.

Thus, according to a preferred embodiment of the present invention the size distribution, M, is selected so that a maximal diameter of the capillaries is suitable for repelling the liquid at the pressure, P. One ordinarily skilled in the art would appreciate that the more M is non-uniform the smaller the size of the capillaries. A typical diameter of the capillaries is from 1 nanometer to 500 nanometers. Such diameter is size wise compatible with capillaries formed in concrete matrices.

Generally, the size of the particulates may vary between about 25 millimeters (25,000 microns) and 5 microns, more preferably between 10 millimeters and 20 microns, more preferably between 5 millimeters and 100 microns and most preferably between 1,000 microns and 200 microns.

In a construction site, large size particulates are easier to handle. Thus, depending on the application and the desired diameter of the capillary the manufacture can select the characteristic variance of the size distribution of the aggregate.

More specifically, in applications in which the expected column of liquid is not high (of the order of a few centimeters) it is sufficient to provide larger particulates and small variance, whereas if the expected column of liquid is higher (of the order a few meters) the particulates are preferably smaller in size and larger in variance. For example, for a column of liquid of about 50-100 cm the preferred variance is about 50 micrometers, for a column of liquid of about 1-10 m the preferred variance is about 30 micrometers and for a column of liquid of about 10-50 m the preferred variance is about 10 micrometers. It is to be understood that the above variances are representative examples and should not be considered as limiting.

Other physical quantities which can be affected by M include, but are not limited to, the specific weight of the aggregate, water absorption capability, thermal properties (e.g., thermal conductivity, specific heat capacity, latent heat) and acoustical isolation. Thus, by varying the size distribution, M, an application-oriented aggregate may be formed. For example, in an acoustical isolated waterproofing application M is selected so as to maximize the acoustical isolation of the aggregate, in temperature isolated waterproofing application M is selected so as to minimize the thermal conductivity of the aggregate, etc.

A judicious selection of the size distribution can also be used to control the ability of the aggregate to allow evaporation of the liquid there through. Evaporation of the liquid through the aggregate enhances the ability of the aggregate to maintain the environment dry and allows vapor passage and equilibrium of vapor pressure. This is in contrast to fully sealed waterproofing materials where the water is trapped inside the volume defined by the material. Hence, according to a preferred embodiment of the present invention, M is selected so that the aggregate is capable of allowing evaporation of the liquid.

One of ordinarily skill in the art would appreciate that the above parameters which, as stated, are selected in accordance with the pressure to which the aggregate 1 is expected to be exposed, are static. In other words, the set of parameters, once selected, fix the pressure limits in which aggregate 1 can be effectively used. However, on some occasions, the pressure actually applying on aggregate 1 on site exceeds the expected limits, e.g., under extreme and unexpected weather conditions. In addition, being made of many particulates, aggregate 1 may exhibits statistical fluctuations in which locally the capillaries exceed their average size by several standard deviations. Furthermore, in interfaces between hydrophobic and non hydrophobic layers, a relatively large capillary size is typically formed. The problem of large interface capillaries is non statistical and affects the overall pressure under which aggregate 1 can be used. This problem may be solved by applying adhesives between hydrophobic and non hydrophobic layers, as further detailed herein under.

While reducing the present invention to practice it has been uncovered that the capillary size of aggregate 1 may be significantly reduced using inflatable particulates capable of absorbing fluid (e.g., water). Once being in contact with the liquid, the inflatable particulates dynamically adjust to the liquid pressure, even when this pressure exceeds its expected value.

Due to the judicious selection of the static parameters of aggregate 1 (e.g., the size distribution, M), the inflatable particulates inflate only when the pressure excides the expected pressure to which aggregate 1 is designed. As the pressure rise, the inflatable particulates start to inflate thus establishing a dynamic pressure barrier. It will be appreciated that most waterproofing applications are performed in a closed spaces, so that the inflation of the inflatable particulates increases internal forces within aggregate 1, blocking residual capillaries and thus enhancing the ability of aggregate 1 to prevent percolation of liquid and passage of water vapor.

The inflatable particulates may be incorporated into aggregate 1 in more than one way. Hence, in one embodiment, the inflatable particulates may be integrated in, or attached to particulates 2, already in the manufacturing stage thereof. This embodiment is further detailed hereinafter, following the description of the suitable materials which may be used to manufacture aggregate 1.

In another embodiment, the inflatable particulates are in the form of free particulates (e.g., a powder). Referring now again to FIG. 1, an inflatable particulate 3 is present in void 4 between particulates 2. When a local increase of liquid occurs, particulates 2 are pressed one against its neighbors, while, at the same time, inflatable particulate 3 absorb the liquid and begins to inflate, hence operates as a small "balloon" having a dynamically expanding surface area. External forces, caused by particulates 2 and acting inwards to void 4 limit the inflating process so that particulate 3 becomes a three-dimensional structure whose shape is similar to the shape of void 4. The inflating process is terminated when particulate 3 essentially occupies void 4, thus reducing the characteristic distance, r, and increasing the pressure, P, under which aggregate 1 is effective. When several such inflatable particulates are present in void 4, the filling of void 4 is more efficient.

According to a preferred embodiment of the present invention, the average size of inflatable particulates is selected so that, when the inflatable particulates are in deflated state, at least one inflatable particulate or, more preferably, several inflatable particulates, occupy void 4. In this embodiment, a typical size of the inflatable particulates is from about 1 micrometer to about 1000 micrometers, preferably, 5-500 micrometers.

Although more than one inflatable particulate may occupy the same void, the inflatable particulates preferably are devoid of any fluid communication there amongst, so that even when the inflatable particulates are in inflated state, the free-flowing nature of aggregate 1 is maintained. This may be accomplished, for example, if the inflatable particulates constitute a sufficiently small volume percentage of aggregate 1. Preferably, the inflatable particulates constitute less than 1% of aggregate 1 by volume, more preferably about 0.2%.

The voids between the hydrophobic surfaces of particulates 2 form a network, at least partially interconnected, in which the largest voids determine the entire behavior of aggregate 1. Thus, the incorporation of even a low percentage of inflatable particulates, results in a small residual number of large interconnected voids hence significantly improves the resistance of aggregate 1 to pressure.

According to a preferred embodiment of the present invention the swelling time of the inflatable particulates is sufficiently small (preferably under 10 seconds) so that aggregate 1 quickly responses to any contact with water. The absorption capability of the inflatable particulates is preferably from about 100 to about 5000 by weight, more preferably from about 200 to about 2000 by weight. The freezing temperature of the inflatable particulates is preferably below about −20° C. (both in inflated and in deflated states) so that aggregate 1 maintains its free-flowing nature even at low temperatures. A judicious selection of the material from which the inflatable particulates are made may result in that cycles of absorption-desorption thereof can be is repeated endlessly.

Any material known capable of swelling when in contact with a liquid can be used for the inflatable particulates, provided that the combination of the inflatable particulates and particulates 2 maintains the free-flowing nature of aggregate 1. Representative examples for such materials include, but are not limited to, starch, clay, bentonite, water blockers of various types and the like. Additional characteristics of interest for the inflatable particulates include, without limiting, thermal isolation, liquid absorbency, sufficiently low freezing temperature, deflating ability in dry environment and the like.

According to a preferred embodiment of the present invention, the inflatable particulates are made of a super absorbent polymer (SAP), also known as Polyols polymers. SAPs are known in the art for many years. What makes SAP water absorbent is the presence of a chemical such as sodium or potassium molecules that cross-links between the hydrocarbon chains of a polymer. These cross-links allow the polymer to form into a single super-molecule capable of holding significant amounts of water. The polymer is typically polyurethane, urethane or polypropylene, but other polymers may also be used. There are hundreds types of SAPs, characterized by various parameters, such as their water pick-up capabilities, the temperature at which water is absorbed and desorbed, abruptness of water release and the like.

A representative example of a SAP include, without limitations, sodium cross linked with polyacrylic acid. Similar SAPs include, but are not limited to, LiquiBlock™ 80, LiquiBlock™ 88, LiquiBlock™ At-03S, LiquiBlock™ 80HS, LiquiBlock™ 88Hs, LiquiBlock™ 144, LiquiBlock™ 144TRS, Norsocryl™ S-35, Norsocryl™ D-60, Norsocryl™ XFS, all of which are purchasable from Emerging Technologies, Inc., North Carolina, USA. These SAPs were experimentally found to be suitable for incorporating with the aggregate 1. Other SAPs are presently manufactured by, and are available from, Union Carbide, BASF Corporation and many other companies.

According to a preferred embodiment of the present invention the inflatable particulates may comprise an anti-caking agent to minimize liquid communication between adjacent inflatable particulates. For example, Norsocryl™ XFS and LiquiBlock™ 144TRS, above, include an anti-caking agent.

Normally, without hydrophobic aggregates, large amount of SAP is needed for waterproofing or blocking the passage of water. This makes the use of SAP, difficult and expensive. One of the advantages of this embodiment of the present invention is that the SAP is used only for the purpose of bridging between capillaries, while most of the waterproofing is accomplished by the inherent hydrophobic properties of aggregate 1. Thus, only a small amount of SAP is needed, as further detailed hereinabove.

In experiments made by the inventor of the present invention, it has been found that by adding an amount as small as 0.2% of Norsocryl S-35 with an average particulate size of 100-500 micrometers, absorption capability of more than 500 by weight and swelling gelling time of about 6 seconds, significantly reduced the capillary size of aggregate 1. In particular, it has been found that the above-mentioned problem of the large capillaries between hydrophobic and non-hydrophobic layers was almost completely eliminated. The elimination or at least reduction of this problem is particularly useful in waterproofing applications in which object (e.g., pipes, tanks, etc.) lies within a hydrophobic layer. In such cases, there is a large surface contact between hydrophobic and non-hydrophobic layers.

It is anticipated that many types of inflatable particulates will be developed during the life time of this patent, and it is therefore within the scope of the present invention to include all such inflatable particulates a-priory.

According to a preferred embodiment of the present invention the hydrophobic aggregate may be mixed with hydrophobic coated lightweight aggregates, for example, Pumis, Perlite, volcanic aggregate, crashed foam concrete, etc. The lightweight aggregates serve for reducing the overall weight of the mixture. The reduced weight is important, for example, when the mixture is used for waterproofing roofs, flooring or any waterproofing done indoors.

For purposes of better understanding the use of the free-flowing hydrophobic aggregate in waterproofing applications in accordance with preferred embodiments of the present invention, reference is first made to a conventional (i.e., prior art) method of waterproofing as illustrated in FIGS. 2A-B.

Referring now to the drawings, FIGS. 2A-B schematically illustrate prior-art methods of waterproofing a foundation of a structure 10 on a ground 12. In general, a foundation layer of pebbles 22, and sidewalls of pebbles 20 are provided as water channels to allow for water flow adjacent to underground section 14 of structure 10. Additionally, the foundation walls of underground section 14 may be covered with tar or a similar material, as an additional water protection. However, when the water table is high (e.g., on rainy days or when a plumbing problem occurs), side pressure 16 and upward pressure 18 may nonetheless be applied to the foundation walls by the underground water, causing cracks and possibly penetrating underground section 14.

According to another aspect of the present invention there is provided a method of waterproofing a portion of a structure being in contact with a ground. The method comprises the following method steps in which in a first step a bed of a free-flowing hydrophobic aggregate is provided, and in a second step the structure is positioned over or in the bed. According to a preferred embodiment of the present invention any free-flowing hydrophobic aggregate may be used, such as, but not limited to, aggregate 1 mentioned hereinabove or another commercially available free-flowing hydrophobic aggregate (also known in the literature as "magic sand"), manufactured, for example, by Clifford W. Estes Co. Inc., New Jersey, USA, and Educational Innovations, Connecticut, USA. Yet, additional aggregates useable in context of the present invention are described in U.S. Provisional Patent Application Nos. 60/486,419 and 60/486,420, WO 03/044124 and U.S. Pat. No. 4,474,852, all of which are hereby incorporated by reference.

Figure 3A:
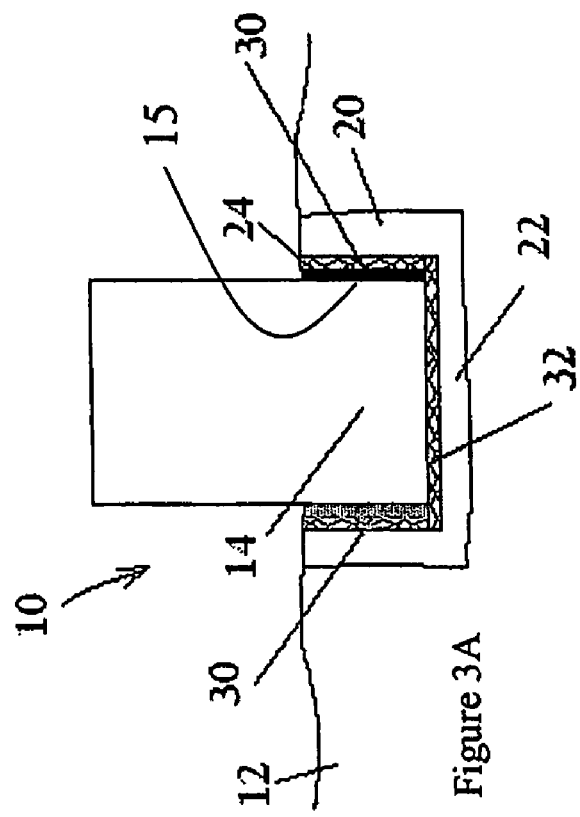
FIGS. 3A-C schematically illustrate methods of waterproofing a foundation of a house, in accordance with a preferred embodiment of the present invention.
Figure 3B:
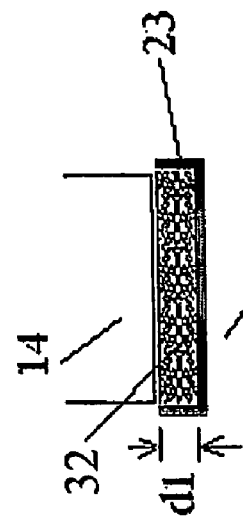
Figure 3C:
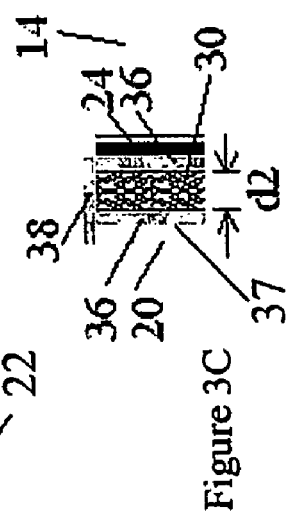

Referring further to the drawings, FIGS. 3A-C schematically illustrate waterproofing of a foundation of a construction, in accordance with a preferred embodiment of the present invention. A bed 32 of free-flowing hydrophobic aggregate is applied over pebble layer 22, preferably remains as a drainage channel under bed 32. Bed 32 prevents water from applying upward pressure onto underground section 14. The hydrophobic aggregate may be delivered to the construction site either in a free-flowing form, or encapsulated in one or protective encapsulations. One example of such protective encapsulation is a hydrophobic brick, as further detailed herein under (see FIG. 4A and the description that follows). Thus, according to a preferred embodiment of the present invention bed 32 may comprise an arrangement of hydrophobic bricks.

Referring to FIG. 3B, bed 32 is preferably protected by a structure 23, for example, a concrete structure or a polymeric structure, to prevent erosion by underground water.

The thickness of bed 32 (designated d1 in FIG. 3B) is preferably from about 1 cm to about 15 cm, more preferably from about 4 cm to about 10 cm. However, it will be appreciated that, depending on specific needs, other values may similarly be used.

According to a preferred embodiment of the present invention, wall 15 of underground section 14 can also be waterproofed by providing a sidewall 30 of the free-flowing hydrophobic aggregate (e.g., aggregate 1) adjacent to wall 15. Objects protruding from wall 15 (nails, metal wires, etc.) which may penetrate through the hydrophobic aggregate and allow water to flow thereupon from ground 12 into underground section 14 are preferably removed from wall 15, prior to the construction of sidewall 30 but further work on walls is not necessary contrary to prior art method in which the walls have to be carefully prepared to accept waterproofing.

Wall 15 is preferably coated by a waterproofing liquid or paste, e.g., tar layer 24. Tar layer 24 (or any alternative waterproofing substrate covering wall 15) adheres the hydrophobic aggregate to wall 15 hence serves as a vapor barrier, preventing a formation of gap between sidewall 30 and wall 15. One would appreciate the advantage of preventing the formation of such a gap because water may flow into the gap from above.

With reference to FIG. 3C, sidewall 30 of the hydrophobic aggregate is preferably protected by a structure 36, which may be, for example, one or more wood boards, polymeric (e.g., polystyrene) boards, plastic boards, metal boards, a brick wall or a concrete structure. Structure 36 is interposed between sidewall 30 and ground 12 (or pebble layer 22) hence serves for protecting sidewall 30 from erosion, roots, rocks and the like. Preferably, structure 36 has a non-smooth surface 37, facing ground 12 or pebble layer 22 for so as to enlarge the contact area between structure 36 and the ground.

The construction of sidewall 30 may be done by more than one way, as further detailed herein below, both to a an existing structure, during repair procedure, and to a new structure, during its construction.

In existing structures, prior art methods typically include the use of foam or swollen materials injected along the existing walls into the interface between the wall and the ground surrounding the wall. In extreme cases the area near the underground wall is exposed or vacuumed using heavy machinery, so as to allow access to the external side of the wall. The wall is than waterproofed by a sealing material, such as elastomeric concrete or various foams. These methods, however, are expensive, complicated, and fail to provide a long-term solution to the moisture problem.

According to a preferred embodiment of the present invention, underground wall 15 can be waterproofed by the following procedure. First, a layer of ground adjacent to the external side of wall 15 is pulled out or vacuumed, leaving a gap of air, and second the gap is filled with the free-flowing hydrophobic aggregate. The free-flowing nature of the hydrophobic aggregate allows for a substantially complete filling of the gap, in contrast to any other foamy or swollen material which does not allow an airflow there through, hence entrap air pockets and cannot fill the entire gap.

In new structures, structure 36 is preferably constructed adjacent to wall 15, in a manner that a gap is formed between structure 36 and wall 15. Subsequently, the gap is filled with the free-flowing hydrophobic aggregate, preferably from the top side, as further detailed hereinabove.

Structure 36 may be made in any way known in the art. Hence, in one embodiment, structure 36 may be an additional wall, e.g., a brick-concrete wall. The advantage of this embodiment is that the additional wall maintains the hydrophobic aggregate in place for a prolonged period of time. Additional advantages of the additional wall include additional strength to the construction and an enhanced isolation (both thermal and acoustical).

In another embodiment, structure 36 may be made of tiles (e.g., plastic tiles) having toothed edges, which fit into each other, tongue and groove fashion. This embodiment has the advantage of holding the hydrophobic aggregate on a first side of structure 36 and the ground on a second side of structure 36. The toothed edge tiles are further detailed herein under with reference to FIG. 9.

In another embodiment, also suitable for new structures, side wall 30 is constructed level by level as follows. Hard boards or other boards, such as, but not limited to, metal, wood and plastic boards) are temporarily positioned adjacent to wall 15, so that a first side of the hard boards is facing wall 15 (again, leaving a sufficient gap there between) and a second side of the hard boards is facing the ground. The gap is filled with the free-flowing hydrophobic aggregate and the ground is allowed to contact the second side of the hard boards. Subsequently, the hard boards are pulled out, preferably upwards, and the procedure is repeated for the next level, preferably using the same hard boards. In this embodiment, to protect the hydrophobic aggregate, protecting structure 36 is preferably positioned permanently between the hydrophobic aggregate and the ground. Alternatively, the hard boards may be used as protecting structure 36. The advantages of this embodiment are that (i) there is no need to build an additional wall near wall 15 and (ii) the filling of the gap is simpler as a relatively small volume is filled at each level.

In any of the above embodiments, the preferred thickness of sidewall 30 (designated d2 in FIG. 3C) is from about 4 cm to about 10 cm. It is to be understood that other values may similarly be used, depending on the expected water pressure.

In an additional embodiment, also suitable for new structures, side wall 30 comprises an arrangement of hydrophobic bricks, each comprising a protective encapsulation having a predetermined shape and encapsulating a free-flowing hydrophobic aggregate.

FIGS. 4A-B schematically illustrate a hydrophobic brick 40 having a protective encapsulation 41 and a hydrophobic brick wall 42. According to a preferred embodiment of the present invention encapsulation 41 is made from a bio degradable material or water degradable material, for example, recycled cardboard devoid of water protection and the like. In this embodiment, the construction of hydrophobic brick wall 42 is by positioning bricks 40 one on top of the other, similarly to the construction of any other brick wall. In time, when encapsulation 41 degrades, the hydrophobic aggregates of adjacent hydrophobic bricks are partially mixed, so that a substantially waterproof sidewall is formed. Once completed, wall 42 is preferably watered in order to facilitate the degrading of bricks.

One or more layers of bricks may be used. Preferably, the brick thickness, in the direction of water protection, d3, is about 2-10 cm, preferably about 4 cm. It will be appreciated that other dimensions may similarly be used.

It is known that structures in contact with the ground are dynamic, due to ground movements or crack formations. Thus, according to a preferred embodiment of the present invention, irrespectively of the method by which sidewall 30 (or brick wall 42) are constructed, a removable cover 38 is preferably provided on the top side thereof, to allow the refill of the gap, with time. Removable cover 38 may be made from any water resistant material, such as, but not limited to, water-proofed concrete stones.

Figure 5A:
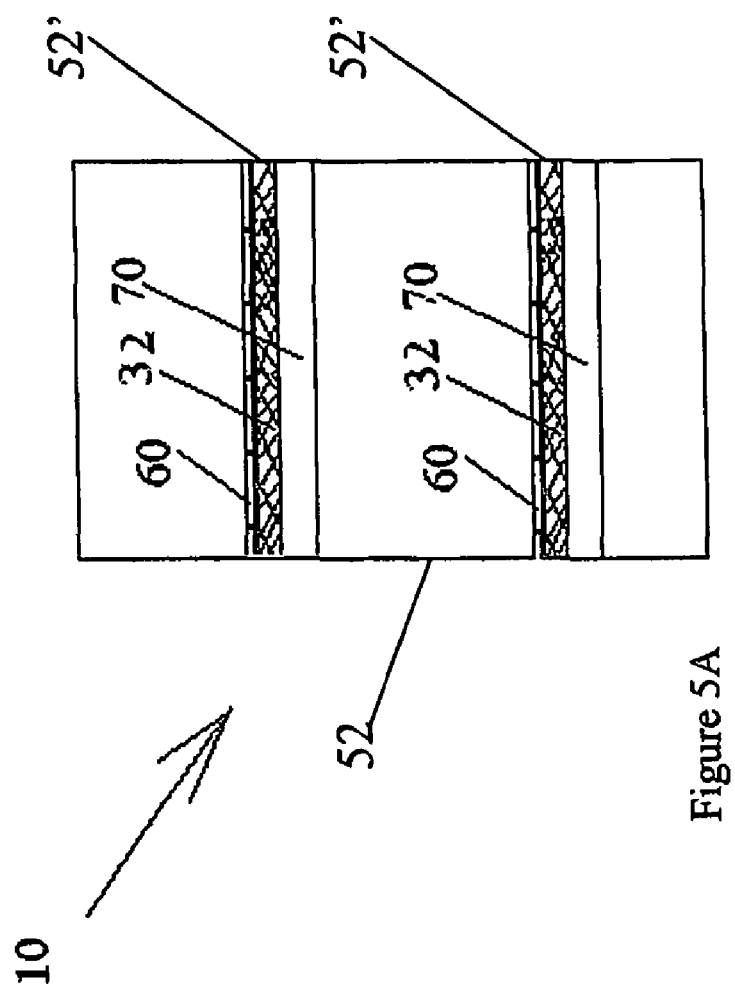
FIGS. 5A-B schematically illustrate methods of waterproofing a floor of a house, in accordance with a preferred embodiment of the present invention.
Figure 5B:
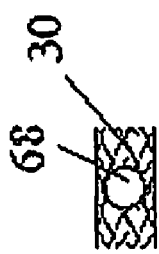

Referring further to the drawings, FIGS. 5A-B schematically illustrate methods of waterproofing floors 60 of structure 10, in accordance with a preferred embodiment of the present invention.

Structure 10 includes several levels 70 and side walls 52. Bed 32 of hydrophobic aggregate (e.g., aggregate 1) is applied under floors 60 and prevents water from collecting under the floor. A typical thickness of bed 32 for this aspect of the invention is about 1-10 cm, however, it will be appreciated that other values may similarly be used. Contact area 52' between wall 52 and bed 32 is preferably coated by a water-proofing liquid or paste which adheres the hydrophobic aggregate to wall 52 hence serves as a vapor barrier, as further detailed hereinabove.

A pipe 68 (e.g., water, sewage, gas, electricity, etc.), if existing, may be embedded in bed 32, for example, under floor 60. The advantage of the hydrophobic aggregate is that it allows water to evaporate there through without becoming wet. Thus, if, for example, leakage occurs from pipe 68, once such leakage is repaired and excessive water is sponged or removed, the hydrophobic aggregate remains dry, thus avoiding situations of wet floors, mildew and health related implications of wetness. This advantage is not found in prior art methods where the water is trapped under the floor for a long time. A particular advantage of the present embodiment is that due to the improved isolating properties of the free-flowing aggregate, no additional isolating materials are necessary for the pipes as is commonly used for hot water pipes or the like. In addition, the free-flowing aggregate protects the pipes also from corrosion and wear.

Another advantage of using bed 32 under floor 60, is that such an environment keeps away insects and other organisms which cannot dig holes or tunnels, or even survive in the dry environment of the hydrophobic aggregate.

An additional advantage is the thermal and acoustical isolation provided by bed 32. Thus, for example, bed 32 is ideal as a bed for placing hot/cold water pipes, for which it will be appreciated that thermal isolation is of utmost important.

Figure 6A:
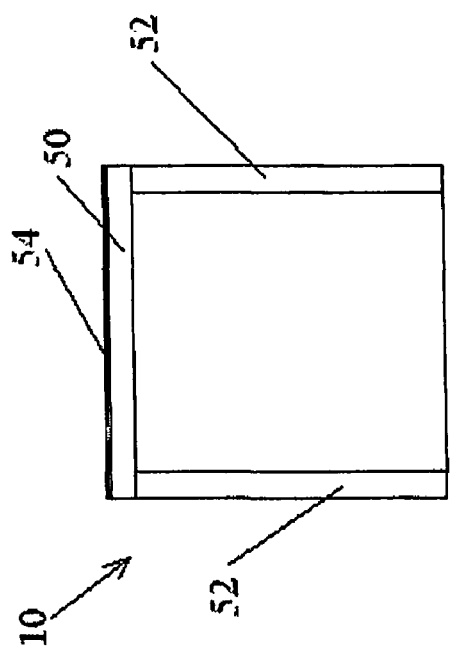
FIGS. 6A-B schematically illustrate prior-art methods of waterproofing a roof.
Figure 6B:
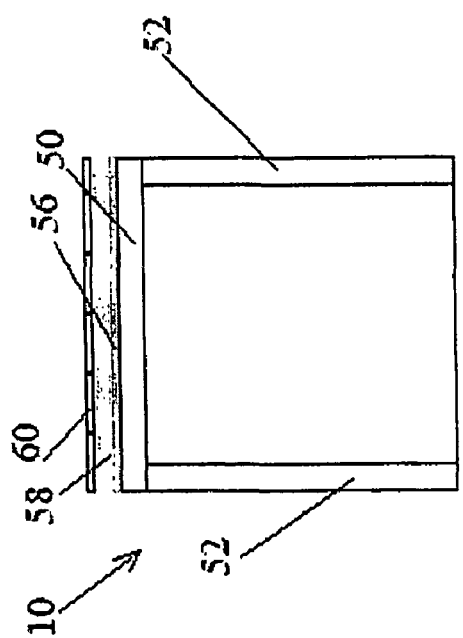

Reference is now made to FIGS. 6A-6B which schematically illustrate prior-art methods of waterproofing a roof 50. Numerous methods are known for waterproofing roofs. One such method is illustrated in FIG. 6A, where a layer 54 of tar is applied to roof 50. Another method is illustrated in FIG. 6B, where a layer of ordinary sand 58 and flooring 60 is applied onto roof 50. Additionally, protective sheets 56, for example bituminous membranes, polyvinyl chloride (PVC) or ethylene propylene diene monomer (EPDM) layers may be used under layer of sand 58. However, none of these are fully satisfactory, and water problems from roofs, in particular flat roofs, are common.

Figure 7:
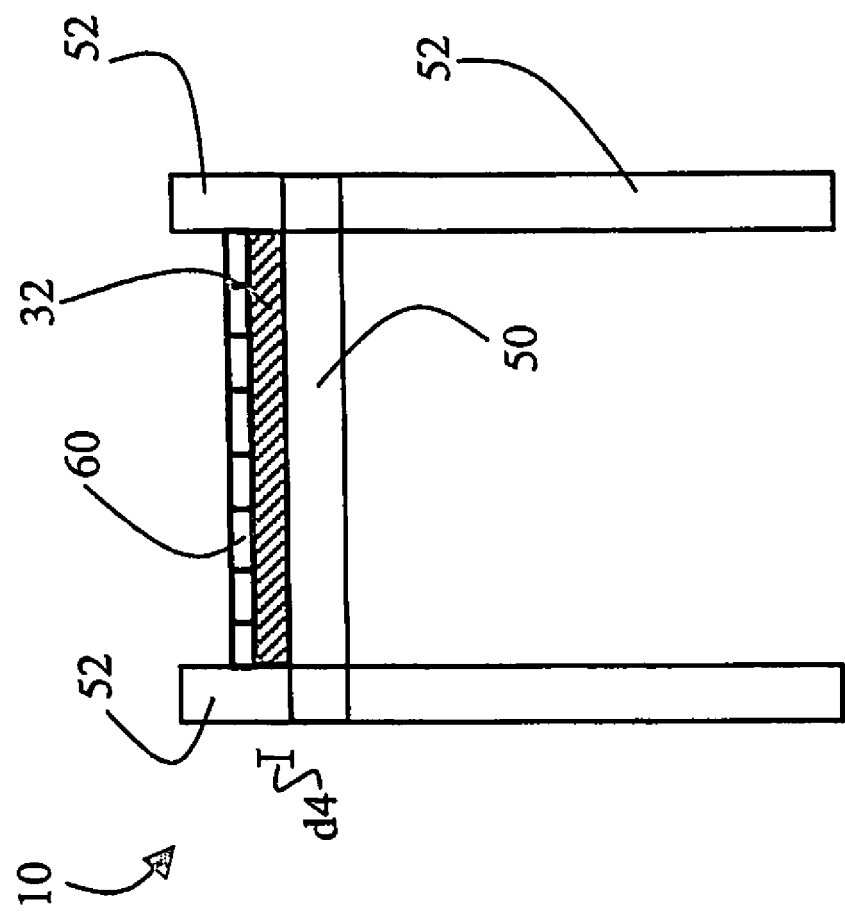
FIG. 7 schematically illustrates a method of waterproofing a flat roof, in accordance with a preferred embodiment of the present invention.

The present invention successfully and advantageously addresses the issue of waterproofing a roof. FIG. 7 schematically illustrates structure 10 having a roof 50 and sidewalls 52.

According to a preferred embodiment of the present invention, bed 32 of hydrophobic aggregate (e.g., aggregate 1) is applied onto roof 50 and remains contained by sidewalls 52. Preferably, prior to the application of bed 32, the contour of roof 50 may be treated by providing vapor barrier and inclined edges, as is well known in the art. Additionally, floor 60 may be applied over bed 32, thus preventing erosion thereof. In this manner, a high-level water-proofing protection is achieved even on severe weather conditions such as hail. The thickness of bed 32 (designated d4 in FIG. 7) is preferably about 5 cm. It will be appreciated that other values may similarly be used.

According to an additional aspect of the present invention, there is provided a method of waterproofing a reservoir, e.g., a water reservoir.

Figure 8:
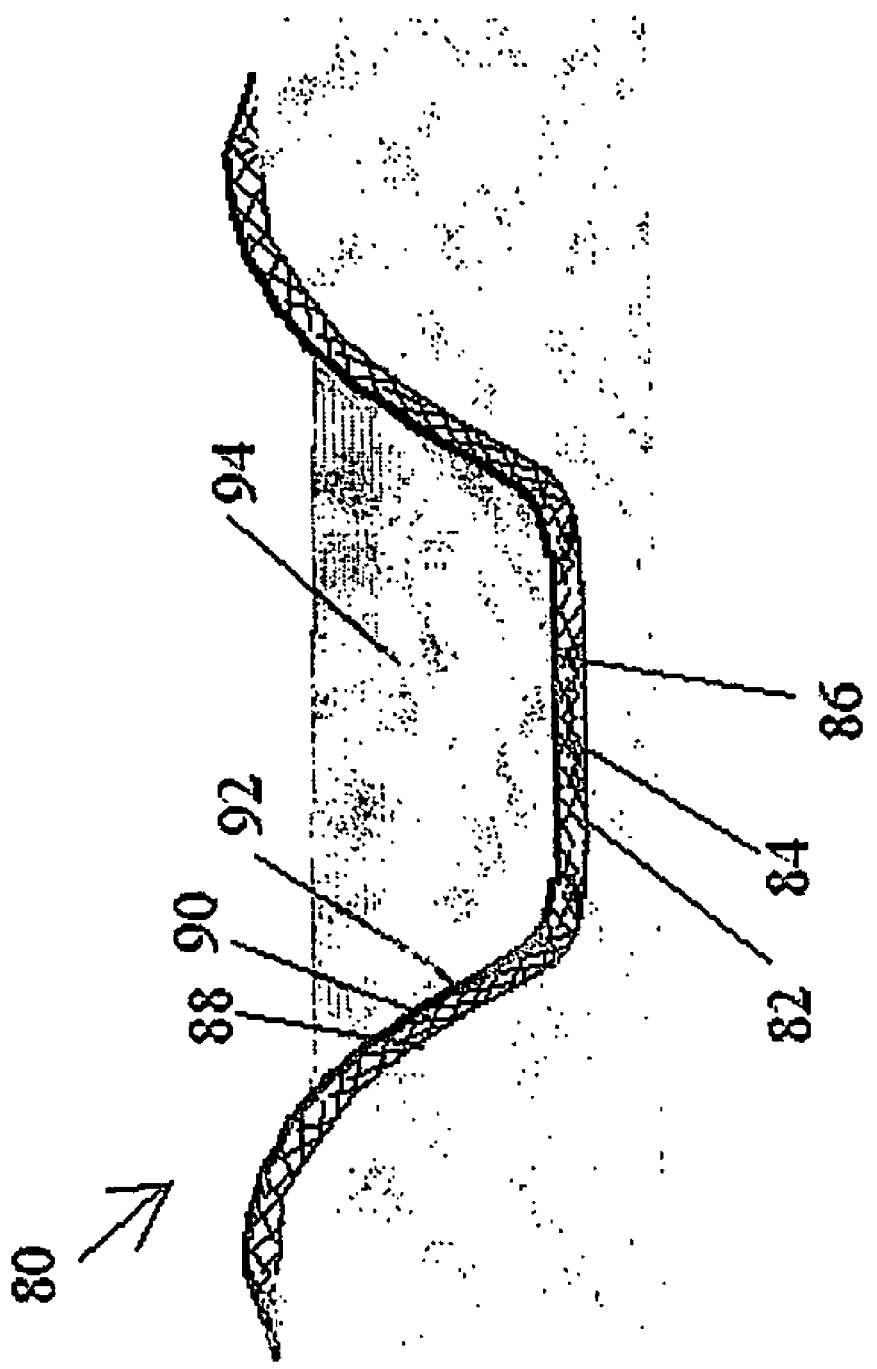
FIG. 8 schematically illustrates a method of waterproofing a reservoir, in accordance with a preferred embodiment of the present invention.

Referring further to the drawings, FIG. 8 schematically illustrates a reservoir 80 having a base 82 and walls 88, which may be sloping walls or vertical walls. According to a preferred embodiment of the present invention, the method comprises the following method steps in which in a first step a flooring bed 84 of a free-flowing hydrophobic aggregate (e.g., aggregate 1) is placed over base 82 of the reservoir. In a second step, walls 90 (sloping walls or vertical, depending on the shape of reservoir 80) of the hydrophobic aggregate are placed over walls 88. Flooring bed 84 and/or walls 90 are preferably covered by protective structure 86 and 92, respectively, so as to maintain free-flowing hydrophobic aggregate in place. Preferably, a minimal depth of about 5-10 cm is maintained between structure 86 and base 82 and between structure 92 and walls 88 for the hydrophobic aggregate.

Structure 86 (covering bed 84) preferably comprises a flexible layer, for example, a geotechnic fabric, covered by a concrete slab, of preferably about 5 cm in thickness. Alternatively, the flexible layer of structure 86 may be covered by concrete tiles. Still alternatively, a portion of the flexible layer of structure 86 may be covered by concrete tiles and another portion may be covered by a concrete slab. According to a preferred embodiment of the present invention the concrete is poured on the flexible layer devoid of metal wiring, to prevent flowing of the hydrophobic aggregate during the construction of structure 86. Polymeric fibers may be added to the concrete mix to minimize crack formations in the structure 86. The pouring of the concrete may be done in any way known in the art, preferably by leaving a sufficient number of gaps to allow the concrete to expand during its curing process.

Structure 86 may also be made of a plurality of protective boards or any other method known in the art.

The method for placing walls 90 depends on the shape of walls 88 of reservoir 80. For vertical walls, walls 90 may be constructed similarly to walls 30 or 42 as further detailed hereinabove.

For sloping walls, a sloping structure 92 is constructed. This may be done, for example, by placing various stabilizing means, such as, but not limited to, nets or nets covered with cloth, and then pouring the free-flowing hydrophobic aggregate from above. As stated, the hydrophobic aggregate allows air to flow there through without formation of air pockets.

Figure 9:
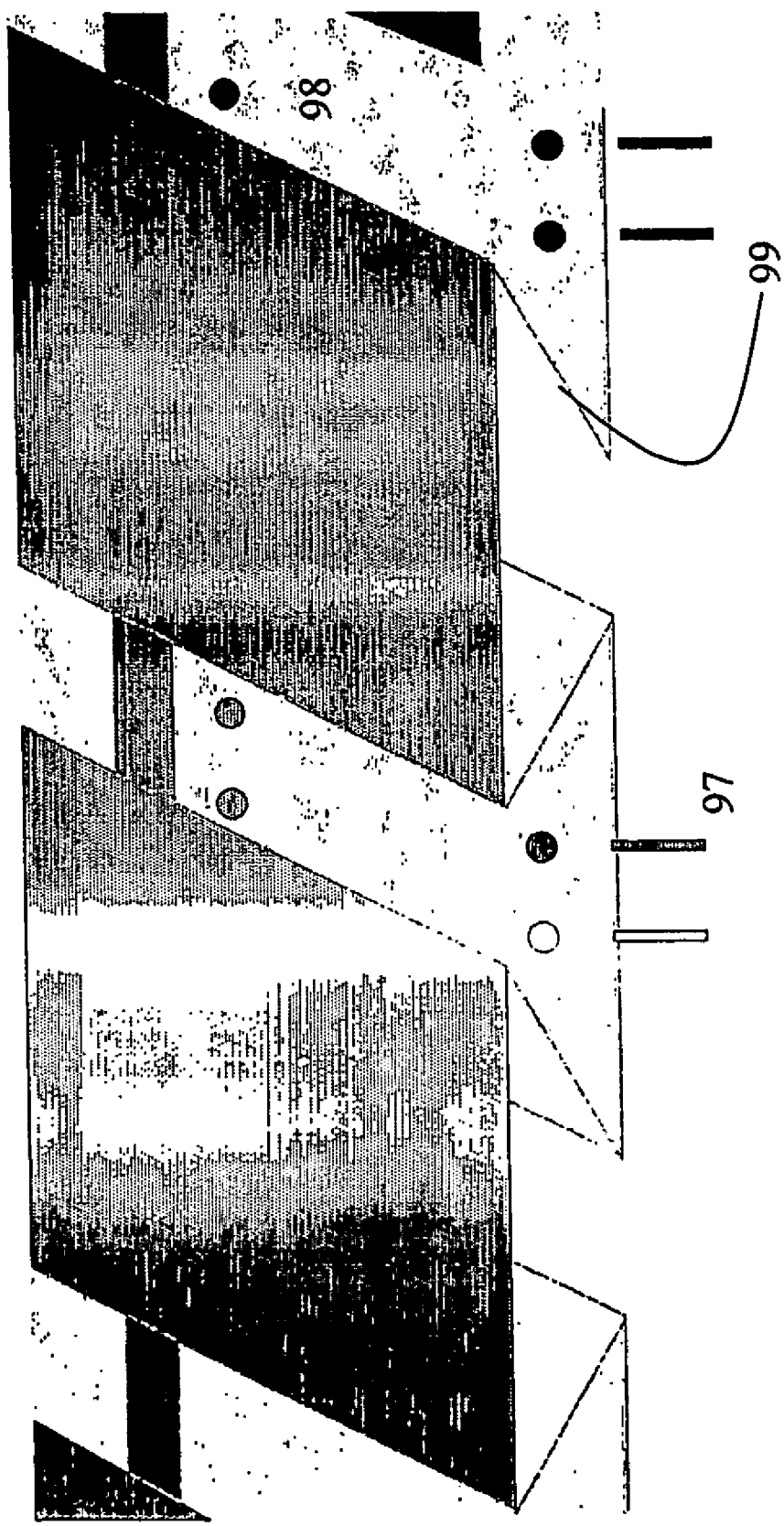
FIG. 9 schematically illustrates tiles with toothed edges, used for holding hydrophobic aggregate in place, in accordance with a preferred embodiment of the present invention.

FIG. 9 schematically illustrates a representative example of stabilizing means, in the form of tiles 98 with toothed edges 99, which fit into each other, tongue and groove fashion. Tiles 98 may be made from polyvinyl chloride, polycarbonate or any other suitable material capable of holding the hydrophobic aggregate. The size and strength of the tiles is preferably selected so as to allow the installer to walk or stand thereon. Several elongators 97 (e.g., screws) are preferably attached to the tiles so as to create a sufficient gap between the tiles and the ground. A typical length of elongators 97 is 1-10 cm.

The procedure of constructing sloping structure 92 using tiles 98 is as follows. A first line of tiles is arranged on sloping wall 88 near base 82, so that elongators 97 keep tiles 98 above the walls. The volume defined by elongators 97 is then filled with the hydrophobic aggregate. According to a preferred embodiment of the present invention tiles 98 may be manufactured from a transparent material so as to allow the installer to verify that the entire volume is filled, and to vibrate the tiles if necessary, so as to better distribute the hydrophobic aggregate. Mechanic or sonic vibration may also be used. Once the first line is filled with the hydrophobic aggregate, a second line is arranged adjacent to the first line, and the procedure is repeated. According to a preferred embodiment of the present invention, once a line of tiles is filled, the elongators of the previous line are removed so as to allow the hydrophobic aggregate to fill the volume engaged by the elongators.

Once wall 88 is covered by tiles 98 and the hydrophobic aggregate, concrete or another suitable cover is preferably be applied on the other side of tiles 98. Toothed edges 99 serve for increasing the surface area of tiles 98 so as to maintain the hydrophobic aggregate and the concrete in place and to allow spray shot crating if so desired. The upper line of tiles is preferably permanently attached to the ground to serve as a protective cover.

According to a preferred embodiment of the present invention the tiles are arranged in a manner that allows refilling of the free-flowing hydrophobic aggregate with time. This can be done, for example, by leaving openings in the upper line of tiles or by providing a removable cover thereupon, as further detailed hereinabove.

The compositions, particulates and free-flowing aggregate of the present invention can also be used in the area of agriculture or gardening where it is often desired to prepare an area for plants cultivating. It is known that only a relatively small part of water used for irrigation finally arrives to the plants, whereby most of the water seeps through the earth or evaporates.

According to a preferred embodiment of the present invention an area of interest can be prepared for plants cultivating by providing a bed of free-flowing hydrophobic aggregate (e.g., aggregate 1) onto the area of interest and covering the bed by a layer of soil. Additionally one or more water collection channels can be positioned in, under or above the soil for allowing conveyance of water. The bed can be in a form of hydrophobic patches, made of a protective encapsulation and encapsulating the aggregate. The patches are preferably arranged such that one or more spaces are formed between adjacent patches, thereby allowing excess water (e.g., rain water), to drain of the area of interest.

Since the hydrophobic aggregate is dry and presents a low resistance for vapor, the bed can conduct a passage for vapor underneath the trees or plants. This effect is further enhanced by the sucking action of the roots. When water is evaporated under and through the hydrophobic bed and condenses again due to temperature changes with time, the hydrophobic bed traps the condensed water and prevents it from escaping again. Thus, water percentage in the top soil layer rises. The effect of vapor and water trapping can be increased by positioning a layer of super absorbent polymer on the hydrophobic bed so as to utilize a larger proportion of vapor.

According to a preferred embodiment of the present invention the layer of soil is surrounded by a protective barrier, which itself can be made of hydrophobic aggregate as further hereinabove. In this embodiment, the walls of the protective barrier and the bed form an enclosed reservoir, preventing the condensed water from escaping therefrom. The height of the walls can vary as desired, depending on the amounts of condensed water, soil type and underground water level.

One of ordinary skill in the art would appreciate that the hydrophobic bed facilitates desalination of non-desalted water present thereunder, because vapors, passing through the bed are substantially desalted, hence, upon condensation the water is being desalinated.

The hydrophobic bed can also be used in a preparation of a salt-free area on a salty soil. In many places around the world, underground water level is high and water is salty. This presents a real challenge both for agriculture and construction applications. Thus, according to a preferred embodiment of the present invention a salt-free area can be provided by providing a hydrophobic bed onto the area of interest and covering the bed by salt-free soil. The bed prevents the salt from penetrating therethrough and at the same time facilitates passage of (non-salty) water vapor, in the aforementioned desalination process. Optionally and preferably, to enhance the capturing of vapor passing through the hydrophobic bed, a layer of super absorbent polymer can be used, to allow formation of gel, as further detailed above. It would be appreciated that the use of hydrophobic bed of the present embodiment as a barrier against salts is advantageous over conventional methods in which barrier sheets are used, because there are no joints or welded parts.

According to a further aspect of the present invention there is provided a method of protecting an object buried underground. In applications in which the hydrophobic aggregate is used for protecting underground objects, it is particularly useful to mix two or more free-flowing hydrophobic aggregates. It is to be understood, however, that it is not intended to limit the scope of the present invention to any number of hydrophobic aggregates (i.e., one, two, three or more hydrophobic aggregates can be used).

Thus, according to another aspect of the present invention, there is provided a hydrophobic composition for protecting an underground object, generally referred to herein as composition 110.

Figure 10:
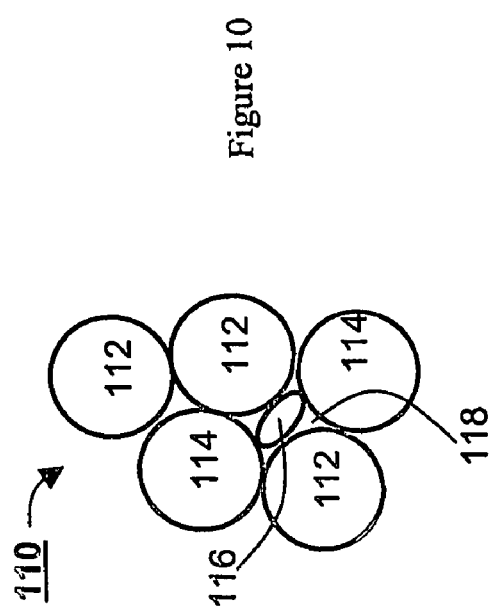
FIG. 10 is a schematic illustration of a hydrophobic composition for protecting an underground object, according to a preferred embodiment of the present invention.

Referring now again to the drawings, FIG. 10 is a schematic illustration of composition 110 which comprises a mix of at least two free-flowing hydrophobic aggregate, each of which may posses one or more properties of aggregate 1. Preferably, composition 110 comprises a thermally conductive free-flowing hydrophobic aggregate 112 and a dielectric free-flowing hydrophobic aggregate 114. Aggregates 112 and 114 are mixed in a predetermined ratio which is selected so as to electrically isolate the underground object while allowing transportation of heat therefrom. According to a preferred embodiment of the present invention composition 110 has a distinguishable color, preferably different than the color of the ground.

Before providing a further detailed description of methods of protecting underground objects, as delineated hereinabove and in accordance with the present embodiments, attention will be given to the following advantages offered thereby.

First, being substantially dry, both aggregates prevent electrolytic processes (such as electrolytic corrosion) from occurring near the underground object. Even in cases where water vapors percolate through composition 110, these are not sufficient to initiate electrolytic corrosion.

Second, as hydrophobic aggregate 114 is made of a dielectric material (i.e., has substantially no electrical conductivity), connection boxes, oil sensors or any other device filled with composition 110, can function without short circuits for a prolonged period of time. The free-flowing form of composition 110 facilitates the removal of the aggregates from the wires and/or the connection boxes, if such a removal is needed, e.g., for maintenance.

Third, the ohmic resistance of conductors being present in connection boxes, and of cables and wires carrying electrical current is known to release energy by generating a substantial amount of heat. The resulting temperature increase often contributes to weakening of both the current carrier and its surrounding non-conducting elements. It is appreciated that lack of a proper heat transport mechanism may results in electrical discontinuities along the wires and cables, especially inside the connection boxes, where most of the heat is generated. Furthermore, in small connection boxes, the generated heat may cause fusion of several conducting elements thereby to create short circuits and damage the systems depending on the underground cable. The thermal conductance of aggregate 112 allow composition 110 to transport heat away from the current carrier (e.g., to the ground) thereby to keep the underground connection boxes, cables and/or wires cool at all times and to maintain their functionality.

Forth, various agents, and especially digesting agents, present in the ground in solid state are prevented from becoming liquefied and therefore from reaching and damaging the underground object.

Fifth, the free-flowing form of the aggregates of the present invention minimizes axial stresses from acting upon the underground object. In other words, although being made of solid particulates, in terms of dynamical properties, the free-flowing hydrophobic aggregates are similar to a viscous fluid, which uniformly distributes the mechanical forces acting thereupon. The aggregates of the present invention thus absorb a considerable amount of the mechanical forces and protects the underground object.

Sixth, being substantially water-free, the hydrophobic aggregates do not freeze and does not stick, hence facilitate an easy access to the underground object in cold regions, and improves resistance to frost.

Seventh, as stated, in one embodiment composition 110 has a distinguishable color. This embodiment can be beneficially used when an identification of composition 110 is required. For example, for the purpose of warning against excavation near the submerged object which is covered by composition 110.

Eighth, underground oil tanks often suffer from oil spills resulting from a leaking tank or an overflow. To monitor such leaks, one or more sensors are positioned near the underground oil tanks so as to generate a signal when the surroundings of the sensor become wet. These sensors, however, often generate false alarm due to the presence of, e.g., rain water. As stated, the composites of the present invention can have an increased attraction for oil and oil related products. Thus, the aggregates of the present invention can be used to selectively prevent water from reaching the sensors, hence substantially reducing the false alarms.

According to a preferred embodiment of the present invention any free-flowing hydrophobic aggregate may be used for aggregates 112 and/or 114, provided they have the required properties, i.e., enhanced thermal conductance of aggregate 112, enhanced electrical resistivity of aggregate 114 and enhanced water repulsion for both aggregate 112 and aggregate 114.

The ability of any hydrophobic material to repel water basically depends on the surface tension of the liquid being in contact with the hydrophobic material. In any liquid, the cohesive forces between molecules present deep in the liquid are shared with all neighboring atoms. The surface molecules of the liquid have no neighboring atoms of the same type above and exhibit stronger cohesive forces upon the molecules directly associated with them on the surface. From a macroscopic point of view, the enhanced intermolecular interaction at the surface of the liquid is observed as the surface tension of the liquid.

The cohesive forces between like molecules compete with external forces existing between the molecules of the liquid and molecules of the material contacting the liquid. When this material is hydrophobic, the cohesive forces significantly dominate, the free surface of the liquid becomes film-like and the liquid is incapable of wetting the hydrophobic material.

Hence, depending on the maximal liquid pressure expected near the underground object, aggregates 112 and 114 are preferably selected such that the cohesive forces are sufficient for preventing the liquid from wetting composition 110.

Any of the aforementioned hydrophobic aggregates, may be mixed in composition 110, according to preferred embodiments of the present invention. In particular, the core material is preferably selected in accordance with the desired property of the free-flowing hydrophobic aggregate. For example, sea sand may be used as the particulated core material for thermally conductive aggregate 112, while coal ash may be used as the particulated core material for dielectric aggregate 114.

According to a preferred embodiment of the present invention each of aggregates 112 and 114 of composition 110 may comprise differently sized particulates characterized by several parameters which influence the hydrophobic properties of composition 110. These parameters may includes the aforementioned size distribution, M, a contact angle, θ.

As stated capillary sizes may be significantly reduced using inflatable particulates, which, in one embodiment can be integrated in, or attached to the particulates of aggregates 112 and/or 114. Alternatively, inflatable particulates cane be in the form of free particulates (e.g., a powder). Referring now again to FIG. 10, an inflatable particulate 116 is present in a void 118 between particulates of aggregates 112 and 114, similarly to the way the inflatable particulate was incorporated with aggregate 1.

Figure 11:
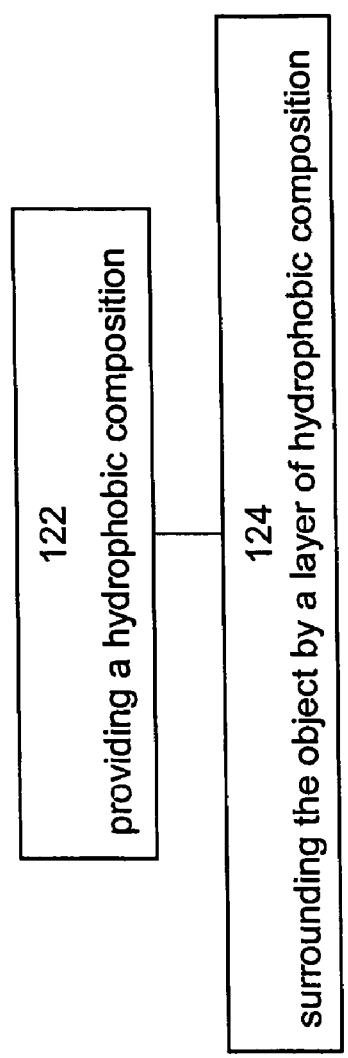
FIG. 11 is a flowchart of a method of protecting an underground object according to a preferred embodiment of the present invention.

According to another aspect of the present invention there is provided a method of protecting an underground object (e.g., a tank, a cable, a wire, a network etc.). The method comprises the following method steps which are illustrated in the flowchart of FIG. 11. In a first step of the method, designated by Block 122 a hydrophobic composition (e.g., composition 110) is provided, and a second step, designated by Block 124 the object is surrounded by a layer of the hydrophobic composition in a manner that the layer is interposed between the object and the ground. The second step my be performed in any way known in the art, for example, by forming a ditch in the ground, applying a first layer of the hydrophobic composition in the ditch, placing the object on the first layer and covering the object with an additional layer of the hydrophobic composition. The upper layer of the hydrophobic composition may be subsequently covered by a layer of ground to prevent the composition from carried by the wind or the rain.

Figure 12A:
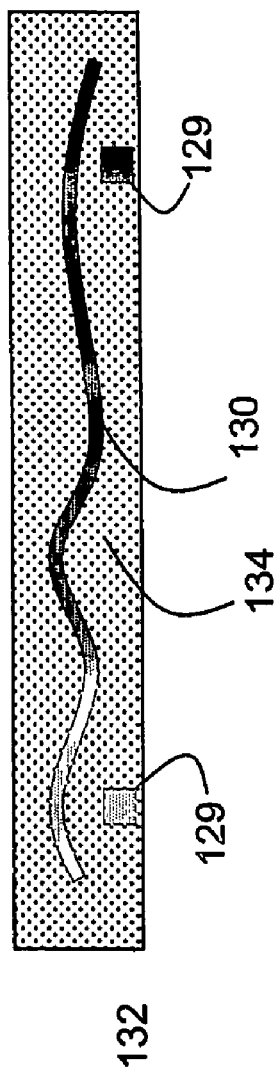
FIG. 12a is a schematic illustration of a an object buried in the ground and surrounded by a layer of the hydrophobic composition, according to a preferred embodiment of the present invention.

FIG. 12a schematically illustrate an object 130 buried in ground 132, and surrounded by a layer 134 of the hydrophobic composition, in accordance with the present invention.

When the underground object is an oil tank, one or more sensors 129 may be positioned near the object within layer 134 so as to monitor possible oil spills. According to the presently preferred embodiment of the invention, the hydrophobic composition is selected so as to allow absorption or adsorption of oil therein, hence to facilitate proper operation of sensors 129 with minimal false alarms. This can be done, for example, by selecting the core material so as to maximize the adsorbing or absorbing capability of the aggregates. Representative example, for such core material includes, without limitation, granolas of cellulose which can provide about 1:1 absorption capability.

This embodiment is particularly useful, e.g., for prevention the generation of false leakage alarms as further detailed hereinabove.

The problem of oil spills also exist in above ground oil tanks which are typically positioned within a dike to prevent oil spills from reaching the soil under the dike. However, over the time, these dikes are filled with rain water, in which case the oil spills overflow from the dike, hence contaminating the ground.

Figure 12B:
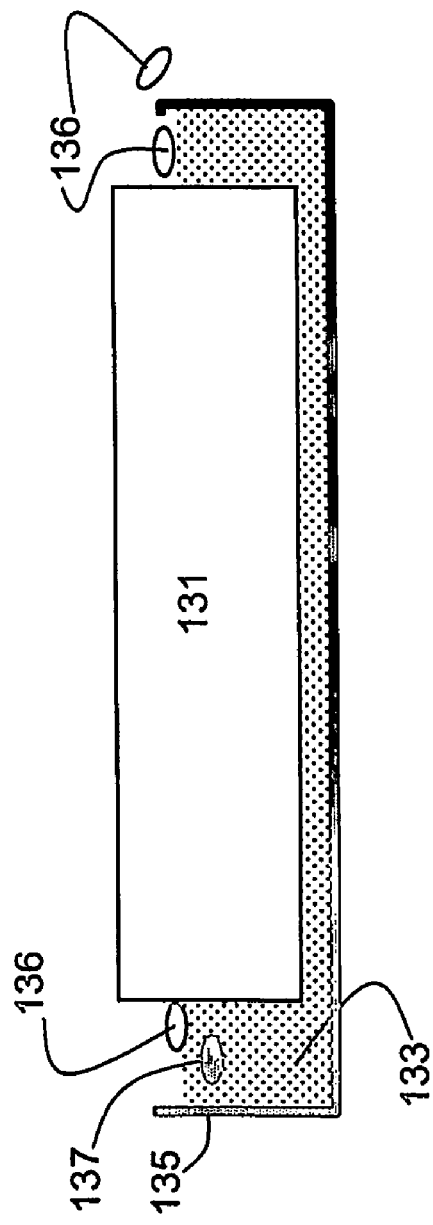
FIG. 12b is a schematic illustration of an above ground object positioned in a dike and surrounded by a layer of the hydrophobic composition, according to a preferred embodiment of the present invention.

Reference in now made to FIG. 12b which is a schematic illustration of an object 131 (e.g., an oil tank) positioned in a dike 135. According to a preferred embodiment of the present invention the surroundings of object 131 within dike 135 is filled by a layer 133 of hydrophobic particulates (e.g., aggregate 1, composition 110, etc.). Preferably, the core material of the hydrophobic particulates is selected so as to maximize the adsorbing or absorbing capability of layer 133. Thus, while water drops 136 are repelled from layer 133, oil spills 137 are attracted thereby, hence causing the water to overflow from dike 135 and keeping the contaminating oil therein.

Figure 13:
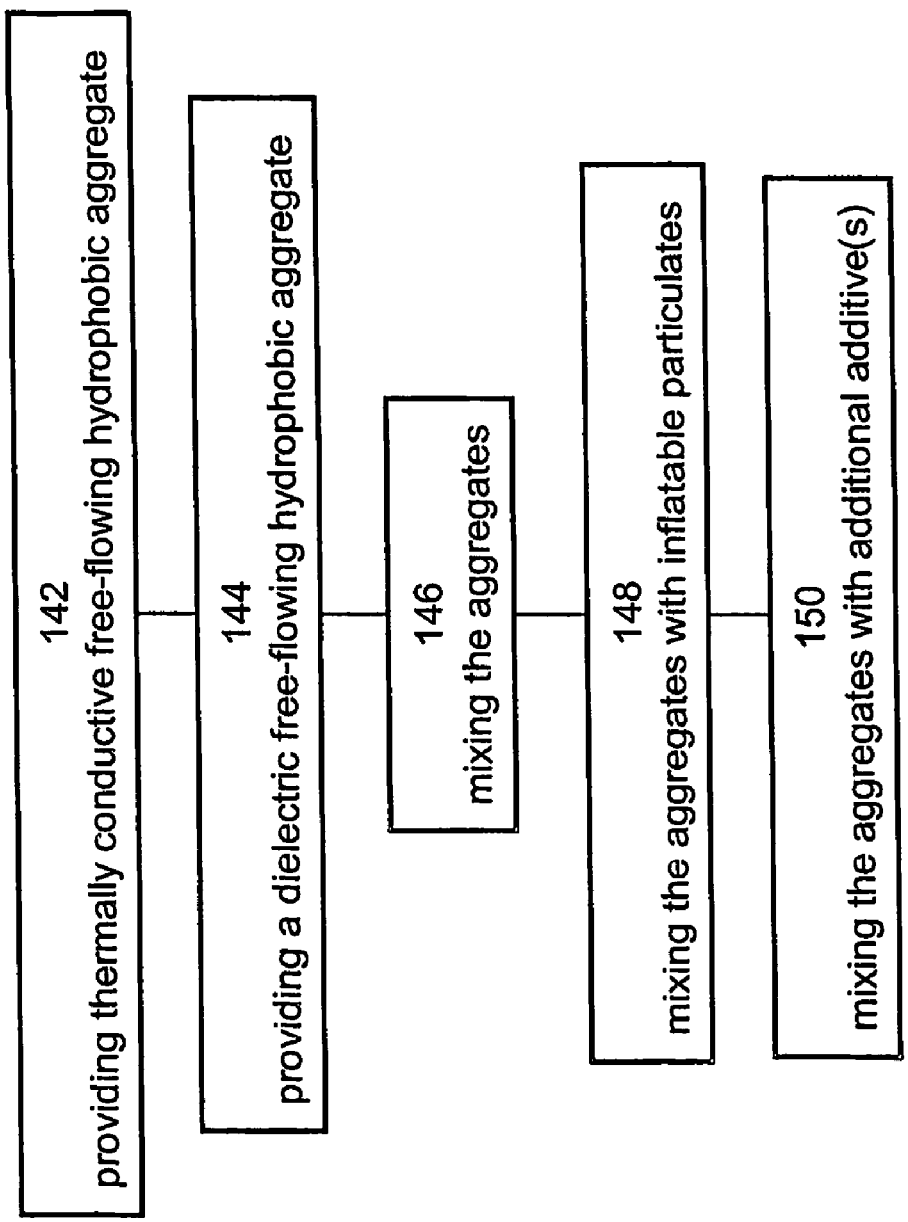
FIG. 13 is a flowchart of a method of manufacturing a hydrophobic composition for protecting an underground object, according to a preferred embodiment of the present invention.

According to another aspect of the present invention there is provided a method of manufacturing a hydrophobic composition for protecting an underground object. The method comprises the following method steps which are illustrated in the flowchart of FIG. 13. In a first step of the method, designated by Block 142 a thermally conductive free-flowing hydrophobic aggregate (e.g., aggregate 112) is provided, in a second step, designated by Block 144 a dielectric free-flowing hydrophobic aggregate (e.g., aggregate 114) is provided and in a third step, designated by Block 146 the two aggregates are mixed. As further detailed above, the mixing ratio of the two aggregates is selected so as to allow both electrical isolation of the underground object and transportation of heat therefrom.

According to a preferred embodiment of the present invention the method may further comprise an optional step, designated by Block 148, in which inflatable particulates (e.g., particulates 116) are mixed with the thermally conductive and the dielectric free-flowing hydrophobic aggregates, as further detailed hereinabove.

Optionally and preferably, the method may further comprise an additional step, designated by Block 150, in which the two aggregates (and the inflatable particulates in the embodiment in which these particulates are included) are mixed with one or more additive, such as, but not limited to, a coloring agent, a UV resistant agent, a bleaching agent and an abrasive agent, as detailed above.

Additional objects, advantages and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

EXAMPLES

Reference is now made to the following examples, which together with the above descriptions illustrate the invention in a non limiting fashion.

Example 1

Preparation of a Hydrophobic Powder

General Procedure

As is described hereinabove, the hydrophobic powder of the present invention includes one or more selected impure elements that have a hydrocarbon attached thereto and optionally hydrophobic fumed silica. The composition of the hydrophobic powder is predetermined according to the desired application.

In cases where the selected hydrophobic powder does not include hydrophobic fumed silica, the hydrophobic powder is preferably prepared by a surface reaction of colloidal particles of one or more selected impure element (e.g., calcium carbonate, magnesium carbonate, calcium oxide, etc.) with a fatty acid having at least 10 carbon atoms in its hydrocarbon chain, to thereby obtain a hydrophobic derivative of the element in a powder form. A representative example of such a hydrophobic powder is Calcium Stearate, which is a commercially available powder that is presently used in pharmaceuticals and plastics. However, such a hydrophobic powder can be prepared, for example, by contaminating calcium carbonate with impurities such as magnesium oxide, iron oxide, aluminium oxide, silica and sulfates, and thereafter reacting the resulting impure calcium with stearic acid.

In cases where the hydrophobic powder further includes hydrophobic fumed silica, the resulting hydrophobic powder mixture is prepared by mixing predetermined amounts of each of the components until uniformity is attained. The mixing is typically continued for about 10 minutes.

A representative example of a hydrophobic powders according to the present invention include a mixture of Calcium Stearate having an average particles size of about 10 microns (obtained from Kfar-Gilaadi Quarries, Israel) and hydrophobic fumed silica having an average particles size not greater than 1 micron (Aerosil Fume Silica, R-812, by Degussa, Germany). The calcium stearate and the fumed silica are mixed for about 10 minutes and the resulting hydrophobic powder has an average particles size not greater than 10 microns.

Example 2

Preparation of Hydrophobic Composites

General Procedure

Drying the core material: The core material (as is defined hereinabove) is dried at a temperature of at least 104° C., until its moisture level is reduced to below 1 weight percentage. This procedure is carried out in a closed mixing vessel equipped with a suction port fitted with a valve enabling opening and closure. Alternatively, a pre-dried core material is placed in the mixing vessel described above and is heated to a temperature of at least 70° C.

Coating the core material with an adherent layer: Preliminary preparation of the adherent layer mixture is carried out in a mixing vessel at a temperature of 40-90° C., during about 10 minutes (the composition of the mixture is determined as is described hereinabove). The adherent mixture is then added hot as it is into the mixing vessel described hereinabove, which contains the dry core material. The resulting mixture of the dry core material and the adherent layer mixture are thereafter heated and mixed, preferably at 30-60 rpm, such that the solvent is evaporated using the suction system described above. Alternatively, this procedure is carried out without heating, by utilizing the self-heat of the core materials, which is formed during the drying process. This procedure continues until the solvent content reaches 0% and typically lasts 10-45 minutes, depending on the type of solvent used in the adherent layer mixture. The evaporated solvent (e.g., an organic solvent) can be recycled for repeated use, both in order to protect the environment and from an economic standpoint.

In cases where other additives are added to the hydrophobic composite (e.g., coloring agents, abrasive powder, UV resistance agents etc., as is detailed hereinabove), the additive is added to the mixing vessel at this stage and mixing is continued, preferably at 30-60 rpm, for additional 5 minutes, to obtain uniformity. The added materials should be dried, so as to have a moisture content of less than 1%.

Coating the core material coated with the adherent layer with a hydrophobic powder: The hydrophobic powder is prepared as described hereinabove in a separate vessel. The resulting hydrophobic mixture of choice, as is detailed hereinabove, is added into the core material mixture. Upon addition of the hydrophobic mixture, the suction port is closed in order to prevent loss of the hydrophobic material. Mixing is continued for about 10 minutes, until the powder cloud completely disappears. The resulting mixture is then cured for between 24 hours and 30 days, depending on the selected hydrophobic mixture, so as to produce the final hydrophobic composite.

The total time of the process between obtaining the dried core material and obtaining the core material coated by the hydrophobic powder ranges between 25 and 60 minutes.

Example 3

Preparation of Hydrophobic Composites in a Cold Process

General Procedure

The core material is dried as is described hereinabove to reach moisture content less than 1%. The dried core material may be stored in a closed dry place to be used for coating when cold, without any need of re-heating.

An adherent layer mixture, which preferably comprises in this procedure 7% polyurethane and 93% ethyl acetate, is prepared as described above and is then added to the dried core material. The quantity of the obtained adherent layer in this process typically ranges between 3 and 7 weight percentages of the dry core material weight. The resulting mixture is mixed at room temperature, for about 10 minutes, until the ethyl acetate is vaporized down to a level of 0%. The evaporated ethyl acetate may be recycled up to about 80% of its content.

A hydrophobic coat mixture of choice is then added as is described above and the resulting mixture is mixed for about 5 minutes.

The final product is obtained after curing between 24 hours and 30 days.

Example 4

Preparation of Hydrophobic Sand

Sand, such as, for example, quartz sand having particles size of 600-800 microns, was dried as is described hereinabove.

In a separate vessel, an adherent mixture containing 9 weight percentages of the polyurethane Alkydal F 48, 55% in benzene-xylel (obtained from Bayer, Germany), 5 weight percentages of commercial liquid asphalt (Premier 1430, obtained from Paz-Kar, Israel) and 86 weight percentages of toluene (obtained from Frutarom, Israel) was mixed, at 70° C., for about 10 minutes and was thereafter added to the hot sand. Mixing was continued for about 15 minutes, at 50 rpm, during which the toluene content was reduced to 0%.

A hydrophobic powder comprised of between 14:1 and 3:1 Calcium Stearate (obtained from Kfar-Gilaadi Quarries, Israel) and hydrophobic fumed silica (Aerosil Fume Silica, R-812, by Degussa, Germany) was prepared in a separate vessel by mixing the components for about 10 minutes and was thereafter added to the hot mixing vessel containing the sand coated by the adherent layer. The suction port was closed and mixing was continued for about 10 minutes at 50 rpm. The product was then cured for 30 days.

Example 5

Preparation of Hydrophobic Sand Enhanced with a Surfeit of Free Particles

In a search for hydrophobic sand having improved resistance to dynamic water, it was found that using an increased amount of the adherent layer, (e.g., up to 2 weight percentages of the dry aggregate) as compared with the amount indicated in the presently known procedures for preparing hydrophobic composites (see, for example, U.S. Pat. No. 4,474,852), results in enhanced resistance of the hydrophobic sand to dynamic wear, due to addition of small hydrophobic particles to the hydrophobic sand.

This enhanced resistance occurs as a result of the following: when a water wave hits the hydrophobic sand, it pushes the grains somewhat apart and when the wave retreats a momentary under-pressure is created, which pulls out the lightweight granules first. This "migration" of the lightweight particles is only carried out due to dynamic motion and the particles move towards the dynamic disturbance, so as to form a thin crust of hydrophobic particles forming an additional protection layer. On account of the strong hydrophobic property of the crust, the retreating water does not pull away this crust and the next wave will then encounter a double hydrophobic defense line.

It was found that such lightweight particles may be achieved by using an excessive amount of the adherent layer. In this manner, the adherent layer components, which do not adjoin the sand, form free, light particles having a size of 1-50 microns. These particles become hydrophobic in the second stage, together with the sand granules, and as they are much lighter in weight than the sand granules, they are attracted first to the momentary under-pressure following the wave and thus form the described crust.

A detailed exemplary procedure of preparing such hydrophobic sand, improved with free particles, is as follows:

Quartz sand, obtained from a quarry, having particles size of 600-800 microns, was dried as is described hereinabove.

In a separate vessel, an adherent mixture containing 15 weight percentages of the polyurethane Alkydal F 48, 55% in benzene-xylel (obtained from Bayer, Germany), 5 weight percentages of commercial liquid asphalt (Premier 1430, obtained from Paz-Kar, Israel) and 80 weight percentages of toluene (obtained from Frutarom, Israel) was mixed, at 70° C., for about 10 minutes and was thereafter added to the hot sand. Mixing was continued for about 15 minutes, at 50 rpm, during which the toluene content was reduced to 0%. The amount of the resulting adherent layer deposited on the sand was 2 weight percentages of the dry sand.

A hydrophobic powder comprised of 14:1 Calcium Stearate (obtained from Kfar-Gilaadi Quarries, Israel) and hydrophobic fumed silica (Aerosil Fume Silica, R-812, by Degussa, Germany) was prepared in a separate vessel by mixing the components for about 10 minutes and was thereafter added to the hot mixing vessel containing the sand coated by the adherent layer. The suction port was closed and mixing was continued for about 10 minutes at 50 rpm. The product was then cured for 30 days.

Example 6

A Hydrophobicity Test

When hydrophobic sand is serially manufactured, on-going tests of the hydrophobic quality of the finished product are required. The presently known methods measure the contact angle or the surface energy of the produced hydrophobic sand. However, although when properly applied these two methods are accurate and reliable, they require expensive and delicate equipment such as a microscope, a computer and optical equipment and therefore these methods are suited for the laboratory but not for ready and rapid production-line application.

Since the required test is comparative and intended to compare similar production batches in regard to their hydrophobic characteristics, an easy, time-consuming and cost-effective test method is required and has been designed, as follows:

A glass beaker is filled with water up to half its height approximately. A small funnel ("sand glass") is placed above the water surface. The glass beaker is placed on an electronic balance and the balance is zeroed. Hydrophobic sand is then added to the funnel until the sand lump falls into the water. The balance indicates the weight of the hydrophobic sand for comparison.

The underlying principle of this designed test is as follows: Since the sand is hydrophobic, it changes the surface tension of the water so that the sand floats on top of the water. The weight of the hydrophobic sand is practically balanced by the surface tension. Hydrophobic sand attempts to reach the minimum contact area possible with the water so that the sand grains cling to one another and the sand lump directs itself towards the beaker center. The small funnel is constructed such that the streaming of the sand is practically constant and the closeness of the nozzle to the water warrants a practical "floating" of the sand and hardly transfers any kinetic energy which could drop down the sand lump prematurely.

In order to compare various sand samples under identical conditions, as far as possible, the following rules should be observed:

The water must come from the same source, and should preferably be distilled;

The water temperature must be identical in all sample tests;

Testing must begin when the water is in static conditions, preferably in an enclosed space;

All other test data must be identical (beaker, funnel, sand, etc.);

A number of tests must be carried out in parallel, observing the statistical sampling rules.

The test can be carried out automatically by inserting an electric stopper at the funnel nozzle, and a detector that indicates the exact moment when the sand lump falls and then halts the sand flow by means of a shutdown valve.

Example 7

Corrosivity Test

In order to verify the protection capability of the hydrophobic sand of the present invention against corrosion of iron, the following corrosivity test has been performed:

Into a container filled with sea-sand, three standard polygonal reinforcing iron construction bars of 10 mm diameter were inserted. The three bars were of identical length and weight. The first bar was dressed with concrete throughout its length in a diameter of about 10 cm, apart from the tip of the bar, which was left exposed for electric connection. Based on the assumption that corrosion level within cast and impacted concrete would be minimal, this bar was intended to serve as control against the two other bars and is referred to hereinafter as control bar. The second bar was left in its natural state and sunk into the sea sand as is, apart from its tip which was left exposed for electric connection, and is referred to hereinafter as natural bar. The third bar was sunk in sea sand surrounded throughout its length with the hydrophobic sand of the present invention (prepared as described in Example 4) in a diameter of about 10 cm, apart from the its tip which was left exposed for electric connection, and is referred to hereinafter as hydrophobic bar.

The second (natural) and third (hydrophobic) bars were electrically connected to the concrete-encrusted bar (control) through 100 ohm resistors.

The sea sand was wetted with water including 8% sodium chloride, added in order to accelerate the corrosion process. The sand wetting was carried out once in a fortnight in order to allow natural drying-up by evaporation.

The electric potentials between the second natural bar (natural) and the control, as well as between the third bar (hydrophobic) and the control bar, were measured every day. The presently obtained data show that the potential difference between the natural bar and the control bar stabilized at a fixed level (about 100 millivolt) thus confirming an on-going corrosion process in the natural bar, whereas the potential difference between the hydrophobic bar and the control bar remained throughout at zero level, confirming that no corrosion was taking place and that the sand indeed protects the iron bar against corrosion.

Pulling out the bars after six months showed no corrosion signs on the hydrophobic bar while the natural bar lost 2.5% of its original weight.

In order to obtain interim data prior to the above laboratory test, uncoated metal paper clips were inserted into a box containing on one-half ordinary sand and on the other half the hydrophobic sand of the present invention, such that one-half of the clips were immersed in the ordinary sand and the other half in the hydrophobic sand of the present invention (prepared as described in Example 4). The experiment was carried out with 10 identical boxes of such clips.

In an additional experiment, 10 pairs of ordinary AAA batteries were submerged in garden soil, whereby one battery of each pair was submerged in the hydrophobic sand of the present invention.

The paper clip boxes were wetted with salt water for about two weeks, whereas the battery pairs were left buried for about two months in the change of seasons between winter and spring, so that the soil was wetted both with rainwater and with artificial irrigation, as is the rule for ordinary garden soil.

After two weeks all the paper-clip boxes opened showed an identical result of corrosion and rust in the half of the paper clip buried in the ordinary sand whereas the other half of the paper clip boxes, buried in the hydrophobic sand of the present invention remained intact without signs of corrosion.

All the batteries buried in regular garden earth showed signs of corrosion at various levels and no electric voltage was measured in these batteries, whereas no sign of corrosion was observed in any battery buried in the hydrophobic sand of the present invention and the voltage in those batteries was indeed preserved.

Example 8

Wear Test

Most of the presently known sealants are usually tested to withstand static water, i.e., water devoid of kinetic energy. At this situation, sealant wear occurs as a result of the reaction between the water and the material, liquid adsorption, expansion or contraction and as a result of the proliferation of various organisms in the standing water, which also accelerates the wear process of the sealant.

However, under real conditions, the sealant must also stand up against dynamic water, since in most cases water do possess kinetic energy. In every case of wetting, natural or artificial, one can see a vertical or horizontal water motion resembling a wave. Just as a sea wave that slams onto the beach and causes a breakup of soil and erosion together with its retreat, in wetting, the water wave accelerates the wear of the sealant and such wear is much faster than the wear caused by static water.

Most of the water motion wear is caused in nature due to solids transported with the water such as sand, various aggregates etc. Therefore, in order to simulate natural wear, a wearing material such as iron oxide powder ($Fe_2O_3$) should be added to the water.

Hence, due to lack of data regarding the effect of real water wear, comparative tests have been conducted, in order to determined the lifetime of the hydrophobic sands of the present invention, compared with other known sealants, and the required thickness of the hydrophobic sands of the present invention.

Hence, two sets of tests were carried out: In the first set tests have been conducted in order to compare between layers of polystyrene, PVC, bituminous sheet, the hydrophobic sand of the present invention (see, Example 4) and the hydrophobic sand improved with free particles of the present invention (see, Example 5). In the second set, five samples of the hydrophobic sand improved with free particles of the present invention (Example 5) having varying thickness between 1 cm and 5 cm were tested for their water wear.

The tests were carried out as follows: A transparent glass beaker equipped with a screw-down metal lid was provided. Into the metal lid a layer of sponge on which the tested sealant was laid was inserted, so that the sample extended over the edge of the glass beaker. Water including 10% iron powder was admitted to the beaker so as to fill one quarter of its area. The lid was screwed down on top of the beaker with the sealant sample serving as gasket. The closed beaker was placed inverted, with the lid down, so that the water covered the sample.

Five beakers, each comprising a different sealant or the same sealant having varying thickness, were placed together on a rotary turntable driven at an intermediate speed of up to 45 rpm. Since these tests were comparative, the beakers were driven together, the water thereby performing a relative circumferential motion around each beaker. Beakers are taken down when the water penetrate the sealant surface and reach the downwards pressing sponge. The total rotation time of each beaker is noted down, considering that one water rotation in the glass simulates one wetting cycle or a single wave. Since the PVC sheet wear lifetime is known, a coefficient is determined for the number of wettings per day so that the test time can be compared based on sealant lifetime in months.

The data obtained indicate that the beaker containing polystyrene was taken down after 4 days and further indicate that no water has been penetrated the sealant surface in the beakers containing the hydrophobic sands of the present invention after two months.

Example 9

Durability of Hydrophobic Composites Under External Pressure

The capability of hydrophobic aggregates to withstand water pressure is proportional to the contact angle cosine and is inversely proportional to the capillary radius or the intergranule clearance radius. Hence, in order to obtain a hydrophobic aggregate that is capable of withstanding high water pressure without being cracked or loosing its hydrophobicity, an aggregate having small particle size (such that the inter-granule clearance radius is minimal) coated by a hydrophobic layer with high contact angle should be used.

In order to measure the capability of hydrophobic aggregates to withstand transitory and continuous pressure, the following test has been designed:

A wide and deep pail is perforated at its bottom with holes that are covered with a porous cloth, passing water but not sand. The pail is filled with hydrophobic sand.

The nozzle of a long syringe is cut off, so as to provide a uniform cylinder. The syringe cross-sectional area is chosen to be 1 cm$^2$, for convenience. Rubber bands are stretched on the syringe external surface, so as to roughen it, and the external surface of the syringe is further covered by a bitomenic paste (or any other gluing agent that is not water-based), so as to attach hydrophobic sand thereto and thereby prevent water passage from the syringe into the hydrophobic sand.

The syringe is inserted into the hydrophobic sand in the pail, so as to make the distance from the cut-off nozzle to the pail bottom serve as the thickness of the tested layer. The syringe is anchored to the pail walls on two sides, such that the syringe distance from any wall is larger than the thickness of the tested layer, to prevent water from "taking the shorter path".

The piston handle top is widened to enable it to take weights, and the thus modified piston is accurately weighed.

The syringe is then half-filled with water and the piston is carefully inserted thereto.

By placing weights on the piston top it is possible to measure the pressure in the long run, as well as to establish the burst-out pressure.

Such a test allows performing comparative tests of the capability to withstand water pressure of various hydrophobic aggregates, assuming the aggregate is incompressible. This assumption must be carefully verified for each type of hydrophobic aggregate tested.

As a representative example, the test described above was performed with a hydrophobic sand prepared as described hereinabove, having a particles size of between 300 and 600 microns and a hydrophobic powder that forms with water a contact angle of 130° C.

A weight of 3 kg (including the piston self-weight) was placed on the piston for 48 hours. The water head remained unchanged during this time period. The load was thereafter gradually increased until burst-out occurred at 4.6 kg.

Example 10

Determination of the Adherent Layer Amount

The core materials that are usable in the hydrophobic composites of the present invention are granulated or particulate materials each characterized by a different shape, surface area, absorbency, surface texture and various other mechanical and chemical characteristics. Therefore, different core materials absorb different quantities of the adherent layer of the present invention until they become fully coated.

It is therefore desirable to calculate the quantity of the adherent layer required to coat a specific core material, both from an economic standpoint and in order to produce hydrophobic composites improved by "free particles", which require excessive amount of the adherent layer, as is detailed hereinabove (see, Example 5).

In order to determine the amount of an adherent layer that is required to fully coat a certain core material, the following test has been designed:

First, the tested core material is sieved to remove small particles. Measured samples of the remaining material are thereafter accurately weighed. The core material is then coated by an adherent layer and a hydrophobic powder, as is described hereinabove, whereby the amount of the adherent layer is much higher than in typical procedures and the amount of the hydrophobic powder is standard and is accurately weighed. As is described hereinabove (in Example 5), such high amounts of the adherent layer result in hydrophobic sand having a surfeit of free particles.

The resulting hydrophobic composite is then cured and is thereafter passed again through the same sieve as before to remove the free particles formed. Measured volumes of samples of the sieved hydrophobic composites are accurately weighed. The weight of the hydrophobic powder added is subtracted from the weight of the hydrophobic composite and the resulting weight is divided by the initial weight of the sample. The obtained ratio expresses the relative amount of the adherent layer in the composite.

Following is a representative example of the described test:

Common building sand was sieved through a 200 micron mesh sieve to remove small particles. Three samples, 500 cm$^3$ each, were weighed, yielding the following results: Sample 1=812 grams; Sample 2=836 grams; Sample 3=821 grams; Mean weight=823 grams.

The sieved sand was thereafter coated by 20 grams of adherent layer and 1.5 grams of hydrophobic powder per each 823 gram quantity of the mixture.

After curing, the sand was re-sieved using the same sieve as before to remove free particles.

Again, three samples of the hydrophobic sand were weighed, yielding the following results: Sample 1=818 grams; Sample 2=839.3 grams; Sample 3=832.1 grams; Mean weight=829.8 grams.

Subtraction of the hydrophobic powder amount (1.5), a ratio of (829.8−1.5)/823=0.64% was obtained, expressing the amount of adherent layer deposited on the core material in the process.

Example 11

Preparation of Hydrophobic Composites Using a Water-Based Adherent Layer

General Procedure

Hydrophobic composites having a core material and a hydrophobic material bonded thereto via a water-based adherent layer, according to the present invention, are generally prepared as follows:

Drying the core material: The core material (as is defined hereinabove) is dried at a temperature of at least 90° C., until its moisture level is reduced to below 1 weight percentage. This procedure is carried out in a closed mixing vessel equipped with a suction port fitted with a valve enabling opening and closure. Alternatively, a pre-dried core material is placed in an open fire furnace and is heated to a temperature of at least 70° C.

Coating the core material with a water-based adherent layer: Preliminary preparation of an adherent layer mixture containing a water-based gluing agent and water, in a ratio of 1:to 99:1, preferably 1:2, is carried out in a mixing vessel at a temperature of 40-90° C., during about 10 minutes. The adherent mixture is then added hot as it is into the mixing vessel described hereinabove, which contains the dry core material. The resulting mixture of the dry core material and the adherent layer mixture is mixed, preferably at 30-60 rpm, and is optionally further heated, and thereafter tumble-dried using the internal heat formed during the reaction, optionally in combination with an external heat and/or a blower, aimed at increasing the drying rate. This procedure continues until the water content reaches 0% and typically lasts 30 minutes.

In cases where other additives are added to the hydrophobic composite (e.g., coloring agents, abrasive powder, UV resistance agents etc., as is detailed hereinabove), the additive is added to the mixing vessel at this stage and mixing is continued, preferably at 30-60 rpm, for additional 5 minutes, to obtain uniformity. The added materials should be dried, so as to have a moisture content of less than 1%.

Coating the core material coated with the water-based adherent layer with a hydrophobic material: A selected hydrophobic material, as is detailed hereinabove, is added into the core material mixture. Upon addition of the hydrophobic material, the suction port is closed in order to prevent loss of the hydrophobic material. The resulting mixture is then cured for between 24 hours and 7 days, depending on the selected hydrophobic material, the temperature and the humidity, so as to produce the final hydrophobic composite.

Example 12

Preparation of Hydrophobic Sand Having a Water-Based Adherent Layer

As representative examples of water-based adherent layers, which can be efficiently used to bind hydrophobic material to a core material, Bitumen-Latex binders and Bitumen-Polymer binders were selected. These binders are commercially available water-based gluing agents, which are known and typically sold as waterproofing pastes. A number of bitumen gluing agents are presently available, which differ one from the other by various physical and chemical properties such as temperature endurance, stability in acidic or alkali environment, ease of application and the like.

Representative examples of hydrophobic sand having a water-based adherent layer, and coated by a Calcium Stearate hydrophobic powder, prepared as described above, were prepared according to the procedures described above, using as the adherent layer a mixture of the following gluing agents and water: Bitumflex (by Bitum, 4 Ayezira str., Haifa Israel), and Elastopaz (by Pazkar, Alon Tavor, Afula, Israel).

The hydrophobicity of the resulting composites was tested as is described hereinabove, using a contact angel test. A contact angle of 140° was observed, thus clearly indicating that all the water-based adherent layer-containing composites can be effectively used in various applications. The high performance achieved with these hydrophobic composites is presumably attributed to the superior tacking force thereof upon drying. The superior performance of these water-based adherent layers is further attributed to their anionic characteristic, which provides for enhanced entrapment of air, which, as is discussed hereinabove, is highly advantageous. It is assumed that the anionic nature forces the Calcium Stearate particles to vertically adhere to the surface, thus achieving a cage-like structure which enables air entrapment.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method of preparing a hydrophobic composite, the method comprising:
applying an adherent layer onto a core material;
subsequently coating said core material with a hydrophobic powder, said hydrophobic powder including at least one impure element having a hydrocarbon chain attached thereto, to thereby provide the hydrophobic composite,
said adherent layer bonding said hydrophobic powder to said core material,
said adherent layer comprising a water-based gluing agent and said applying comprising admixing said core material with an aqueous adherent mixture containing said water-based gluing agent and an aqueous solvent, while removing all of said aqueous solvent from said mixture of said core material and said adherent mixture, to thereby provide said core material having applied thereon said adherent layer.

2. The method of claim 1, further comprising drying said core material prior to said applying.

3. The method of claim 1, further comprising drying said core material prior to said admixing.

4. The method of claim 1, further comprising, after said coating, curing said hydrophobic composite.

5. The method of claim 1, wherein said core material is selected from the group consisting of a particulate material and a granulate material.

6. The method of claim 5, wherein said core material is selected from the group consisting of sand, gravel, slag, porcelainite, dolomite, porcelain, basalt, quartz sand, coal ash, chalk, zeolite, montmorillonite, attapulgite, flint, bentonite, perlite, mica, wood chips, nut shells, sawdust and combinations thereof.

7. The method of claim 6, wherein said core material is quartz sand.

8. The method of claim 5, wherein said core material has an average particle size ranging between 25 millimeters and 5 microns.

9. The method of claim 1, wherein said adherent mixture further comprises a gluing agent.

10. The method of claim 9, wherein said gluing agent is a volatile hydrocarbon having at least 12 carbon atoms.

11. The method of claim 10, wherein said gluing agent is selected from the group consisting of liquid asphalt, paraffin wax, beeswax, lanolin wax, linseed oil and combinations thereof.

12. The method of claim 1, wherein said hydrophobic powder has an average particle size ranging between 0.02 micron and 50 microns.

13. The method of claim 1, wherein said hydrophobic powder has a surface area ranging between 1 $m^2$/gram and 60 $m^2$/gram.

14. The method of claim 1, wherein said hydrophobic powder further comprises hydrophobic fumed silica.

15. The method of claim 14, wherein said hydrophobic fumed silica constitutes between 1 and 99 weight percentages of said hydrophobic powder.

16. The method of claim 1, wherein said adherent layer constitutes between about 0.5 and about 7 weight percentages of said hydrophobic composite.

17. The method of claim 1, wherein said hydrophobic powder constitutes between about 0.1 and about 5 weight percentages of said hydrophobic composite.

18. The method of claim 1, wherein a concentration of said water-based gluing agent in said aqueous adherent mixture ranges between about 1 weight percentage and about 99 weight percentages.

19. The method of claim 1, wherein said aqueous solvent is water.

20. The method of claim 1, wherein removing said aqueous solvent is performed by tumble drying.

21. The method of claim 1, further comprising, prior to said coating, admixing said core material having thereon said adherent layer with an additive selected from the group consisting of a coloring agent, a UV resistant agent, a bleaching agent and an abrasive agent.

22. The method of claim 1, wherein said hydrocarbon chain comprises at least 10 carbon atoms.

23. The method of claim 1, wherein said hydrocarbon chain is covalently attached to said at least one impure element.

24. The method of claim 23, wherein said hydrocarbon chain is a residue of a fatty acid having at least 12 carbon atoms.

25. The method of claim 24, wherein said fatty acid is selected from the group consisting of stearic acid, lauric acid, myristic acid, palmitic acid, oleic acid, linolenic acid and arachidonic acid.

26. The method of claim 1, wherein said at least one impure element is selected from the group consisting of a metallic element, a semi-metallic element and a transition metallic element.

27. The method of claim 1 wherein said at least one impure element is selected from the group consisting of magnesium, calcium, aluminum, zinc, sodium, barium, zirconium, manganese, titanium, vanadium, chromium, iron and combinations thereof.

28. The method of claim 1, wherein said hydrophobic powder has an average particle size ranging between 0.02 micron and 50 microns.

29. The method of claim 1, wherein said hydrophobic powder has a surface area ranging between 1 $m^2$/gram and 60 $m^2$/gram.

30. The method of claim 1, wherein said hydrophobic powder is calcium stearate.

* * * * *